US012246538B2

(12) United States Patent
Hattori

(10) Patent No.: US 12,246,538 B2
(45) Date of Patent: Mar. 11, 2025

(54) HEAD MAINTENANCE SYSTEM, PRINTING SYSTEM, AND HEAD MAINTENANCE METHOD

(71) Applicant: FUJIFILM Corporation, Tokyo (JP)

(72) Inventor: Kazumasa Hattori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 125 days.

(21) Appl. No.: 18/336,018

(22) Filed: Jun. 16, 2023

(65) Prior Publication Data

US 2023/0330994 A1 Oct. 19, 2023

Related U.S. Application Data

(63) Continuation of application No. PCT/JP2021/045789, filed on Dec. 13, 2021.

(30) Foreign Application Priority Data

Dec. 24, 2020 (JP) ................................ 2020-214873

(51) Int. Cl.
*B41J 2/165* (2006.01)

(52) U.S. Cl.
CPC ....... *B41J 2/16544* (2013.01); *B41J 2/16552* (2013.01); *B41J 2/16502* (2024.05); (Continued)

(58) Field of Classification Search
CPC ......................... B41J 2/16544; B41J 2/16552; B41J 2/16502; B41J 2002/16558; B41J 2002/1657; B41J 2002/16576
See application file for complete search history.

(56) References Cited

U.S. PATENT DOCUMENTS 8,820,890 B2 9/2014 Ishibashi et al.
9,296,211 B2 * 3/2016 Ozaki ................. B41J 2/16588
(Continued)

FOREIGN PATENT DOCUMENTS

EP 2738004 6/2014
JP 2014195934 10/2014
(Continued)

OTHER PUBLICATIONS

"International Search Report (Form PCT/ISA/210) of PCT/JP2021/045789", mailed on Mar. 1, 2022, with English translation thereof, pp. 1-5.

(Continued)

*Primary Examiner* — Sharon Polk
(74) *Attorney, Agent, or Firm* — JCIPRNET

(57) ABSTRACT

Provided are a head maintenance system, a printing system, and a head maintenance method with which preferable washing of a nozzle surface can be realized and a damage to the nozzle surface can be suppressed. The head maintenance system includes: a wiping device (3) including a wiping sheet (10) for wiping a nozzle surface (52) of an ink jet head (50); a relative movement device (2, 3) that relatively moves the ink jet head and the wiping sheet; and a pressing device (18, 56) that presses the wiping sheet against the nozzle surface, in which the wiping device includes the wiping sheet having a value of linearity of compression in a range of 0.3 or more and less than 0.6, the linearity of compression being measured using a compression tester.

11 Claims, 15 Drawing Sheets

(52) U.S. Cl.
CPC ................. *B41J 2002/16558* (2013.01); *B41J 2002/1657* (2013.01); *B41J 2002/16576* (2013.01)

(56) References Cited

U.S. PATENT DOCUMENTS

| | | | |
|---|---|---|---|
| 9,597,877 B2 | 3/2017 | Kajimoto et al. | |
| 10,875,310 B2* | 12/2020 | Borrego Lebrato | B41J 2/16541 |
| 11,247,474 B2* | 2/2022 | Ozaki | B41J 2/16526 |
| 2016/0144627 A1 | 5/2016 | Ozaki et al. | |
| 2016/0250858 A1 | 9/2016 | Nakano et al. | |
| 2018/0178523 A1 | 6/2018 | Nakamura | |
| 2020/0207099 A1 | 7/2020 | Sakon et al. | |
| 2021/0291530 A1 | 9/2021 | Shinomiya et al. | |

FOREIGN PATENT DOCUMENTS

| | | |
|---|---|---|
| JP | 2015003491 | 1/2015 |
| JP | 5814157 B2 * | 11/2015 |
| JP | 2016155354 | 9/2016 |
| JP | 2017023462 | 2/2017 |
| JP | 2018103399 | 7/2018 |
| JP | 2020023142 | 2/2020 |
| JP | 2020104323 | 7/2020 |
| WO | 2012060310 | 5/2012 |
| WO | 2020112968 | 6/2020 |

OTHER PUBLICATIONS

"Written Opinion of the International Searching Authority (Form PCT/ISA/237) of PCT/JP2021/045789", mailed on Mar. 1, 2022, with English translation thereof, pp. 1-6.

"Search Report of Europe Counterpart Application", issued on Apr. 24, 2024, pp. 1-10.

J.P. Singh et al., "Compression behaviour of woven terry fabrics", The Journal of The Textile Institute, vol. 106, No. 9, Sep. 3, 2014, pp. 953-962.

* cited by examiner

FIG. 5

| WEB | 196,197 | 192,193 | 191 | 194,195 |
|---|---|---|---|---|
| LINEARITY OF COMPRESSION LC | LC < 0.33 | 0.33 ≤ LC < 0.44 | 0.44 ≤ LC < 0.60 | 0.60 ≤ LC |
| JETTING DEFLECTION | − | + | ++ | + |
| FIRMLY-ADHERING INK REMOVAL | − | + | + | ++ |
| DAMAGE TO NOZZLE SURFACE | ++ | ++ | ++ | − |

HEAD MAINTENANCE SYSTEM, PRINTING SYSTEM, AND HEAD MAINTENANCE METHOD

CROSS-REFERENCE TO RELATED APPLICATIONS

The present application is a Continuation of PCT International Application No. PCT/JP2021/0045789 filed on Dec. 13, 2021 claiming priority under 35 U.S.C § 119(a) to Japanese Patent Application No. 2020-214873 filed on Dec. 24, 2020. Each of the above applications is hereby expressly incorporated by reference, in its entirety, into the present application.

BACKGROUND OF THE INVENTION

1. Field of the Invention

The present invention relates to a head maintenance system, a printing system, and a head maintenance method.

2. Description of the Related Art

In an ink jet printing device, adhesion of ink mist or the like may occur on a nozzle surface on which a nozzle opening of an ink jet head is formed. In the ink jet head, jetting abnormality may occur because of adhesion of ink mist or the like to the nozzle surface.

JP2014-195934A discloses an ink jet printing device that applies a washing solution to a nozzle surface and wipes off attachment adhering to the nozzle surface by using an absorbing member that absorbs the attachment adhering to the nozzle surface. In the device disclosed in JP2014-195934A, in a case in which the nozzle surface is wiped using the absorbing member, a load of 8 gram-force per centimeter or more and 150 gram-force per centimeter or less is applied to press the absorbing member against the nozzle surface. As a result, excellent cleaning performance of the nozzle surface is realized.

EP2738004A1 discloses the same device as the device disclosed in JP2014-195934A in which a range of pressing force of the absorbing member with respect to the nozzle surface is 50 gram-force or more and 500 gram-force or less. In addition, EP2738004A1 discloses a range of 75 gram-force or more and 300 gram-force or less as a preferable range of the pressing force.

JP2015-003491A discloses an ink jet printing device that executes maintenance of an ink jet head in which a washing solution is applied to a nozzle surface by jetting the washing solution from a jetting nozzle toward the nozzle surface, and the washing solution is sucked out by pressing a fiber cloth against the nozzle surface.

SUMMARY OF THE INVENTION

However, strong wiping of the nozzle surface may damage a water-repellent film formed on the nozzle surface. On the other hand, in a case in which the nozzle surface is weakly wiped to prevent the water-repellent film from being damaged, ink mist or the like adhering to the nozzle surface may not be sufficiently removed.

JP2014-195934A discloses magnitude of force per unit length as the pressing force of the absorbing member with respect to the nozzle surface. Similarly, EP2738004A1 discloses magnitude of force as the pressing force of the absorbing member with respect to the nozzle surface. However, susceptibility of the nozzle surface to a damage varies depending on a type of absorption for wiping the nozzle surface. For example, even in a case in which specified pressing force is applied, there is a concern that the nozzle surface is damaged in a case in which the absorbing member that easily damages the nozzle surface is used.

JP2015-003491A does not disclose characteristics of the fiber cloth applied to the wiping of the nozzle surface. In sucking out the washing solution applied to the nozzle surface, the characteristics of sucking out the washing solution vary depending on a type of the fiber cloth, and the susceptibility of the nozzle surface to a damage varies depending on the type of the fiber cloth. In the invention disclosed in JP2015-003491A, it is difficult to achieve both preferable suction of the washing solution and suppression of the damage on the nozzle surface.

The present invention has been made in view of such circumstances, and an object of the present invention is to provide a head maintenance system, a printing system, and a head maintenance method with which preferable washing of a nozzle surface can be realized and a damage to the nozzle surface can be suppressed.

A head maintenance system according to the present disclosure comprises: a wiping device including a wiping sheet for wiping a nozzle surface of an ink jet head; a relative movement device that relatively moves the ink jet head and the wiping sheet; and a pressing device that presses the wiping sheet against the nozzle surface, in which the wiping device includes the wiping sheet having a value of linearity of compression in a range of 0.3 or more and less than 0.6, the linearity of compression being measured using a compression tester.

According to the head maintenance system according to the present disclosure, in the wiping sheet for wiping the nozzle surface, the value of the linearity of compression measured using the compression tester is in the range of 0.3 or more and less than 0.6. As a result, preferable washing of the nozzle surface is realized, and a damage to the nozzle surface in wiping the nozzle surface is suppressed.

An aspect in which a water-repellent film having liquid repellency against ink is formed on the nozzle surface of the ink jet head may be provided.

As the wiping sheet, a sheet such as paper or cloth having absorbency against ink is applied.

In the head maintenance system according to another aspect, the wiping device includes the wiping sheet satisfying $dT/T0 \leq -1.1\times LC+0.7$ in a case in which an uncompressed thickness in a case in which specified pressure is not applied is denoted by T0, a compressed thickness in a case in which the specified pressure is applied is denoted by dT, and the linearity of compression is denoted by LC.

According to such an aspect, it is possible to achieve both wiping performance of the nozzle surface and suppression of the damage on the nozzle surface.

In the head maintenance system according to another aspect, the wiping device includes the wiping sheet in which the uncompressed thickness T0, the compressed thickness dT, and the linearity of compression LC satisfy $0.4 \leq dT/T0 \leq -1.1\times LC+0.7$.

According to such an aspect, it is possible to relax an accuracy of a mechanical mechanism for pressing the wiping sheet against the nozzle surface.

In the head maintenance system according to another aspect, the wiping device includes the wiping sheet in which the uncompressed thickness T0, the compressed thickness dT, and the linearity of compression LC satisfy $-1.2\times LC+0.7 \leq dT/T0 \leq -1.1\times LC+0.7$.

According to such an aspect, it is possible to realize more preferable wiping performance.

The head maintenance system according to another aspect further comprises: a washing solution applying device that applies a washing solution to at least any of the nozzle surface or the wiping sheet.

According to such an aspect, it is possible to dissolve ink adhering to the nozzle surface by using the washing solution.

The head maintenance system according to another aspect further comprises: one or more processors, in which the processor executes a control of the washing solution applying device such that an application amount of the washing solution applied from the washing solution applying device is in a range of 0.41×WC+0.01 milliliters per square centimeter or more and 0.76× WC+0.02 milliliters per square centimeter or less, in a case in which a compression workload of the wiping sheet measured using the compression tester is denoted by WC, and the compression workload WC is 0.03 gram-force per centimeter or more and 0.59 gram-force per centimeter or less.

According to such an aspect, it is possible to suppress occurrence of jetting abnormality of the ink jet head caused by an excess or deficiency of the washing solution.

The head maintenance system according to another aspect further comprises: a washing solution wiping device that wipes off the washing solution adhering to the nozzle surface by using a wiping sheet in a dry state.

According to such an aspect, it is possible to suppress occurrence of a defect of the ink jet head caused by the residual washing solution on the nozzle surface.

In the head maintenance system according to another aspect, the pressing device applies pressure of 5 kilopascals or more and 20 kilopascals or less to the nozzle surface.

According to such an aspect, in a case of wiping the nozzle surface, pressure in an appropriate range is applied to the nozzle surface.

A printing system according to the present disclosure comprises: an ink jet head; and a maintenance device of the ink jet head, in which the maintenance device includes a wiping sheet for wiping a nozzle surface of the ink jet head, a relative movement device that relatively moves the ink jet head and the wiping sheet, and a pressing device that presses the wiping sheet against the nozzle surface, and the wiping sheet has a value of linearity of compression in a range of 0.3 or more and less than 0.6, the linearity of compression being measured using a compression tester.

According to the printing system according to the present disclosure, it is possible to obtain the same effects as those of the head maintenance system according to the present disclosure. The configuration requirements of the head maintenance system according to another aspect may be applied to the configuration requirements of the printing system according to another aspect.

In the printing system according to another aspect, in the ink jet head, a water-repellent film having water repellency against ink jetted from the ink jet head is formed on the nozzle surface.

According to such an aspect, it is possible to suppress adhesion of ink to the nozzle surface in the ink jet head.

A head maintenance method according to the present disclosure comprises: pressing a wiping sheet for wiping a nozzle surface of an ink jet head against the nozzle surface; relatively moving the ink jet head and the wiping sheet; and wiping the nozzle surface by using the wiping sheet, in which the wiping sheet having a value of linearity of compression in a range of 0.3 or more and less than 0.6 is applied, the linearity of compression being measured using a compression tester.

According to the head maintenance method according to the present disclosure, it is possible to obtain the same effects as those of the head maintenance system according to the present disclosure. The configuration requirements of the head maintenance system according to another aspect may be applied to the configuration requirements of the head maintenance method according to another aspect.

According to the present invention, in the wiping sheet for wiping the nozzle surface, the value of the linearity of compression measured using the compression tester is in the range of 0.3 or more and less than 0.6. As a result, preferable washing of the nozzle surface is realized, and a damage to the nozzle surface in wiping the nozzle surface is suppressed.

BRIEF DESCRIPTION OF THE DRAWINGS

FIG. 5 is a graph showing results of an evaluation experiment.

DESCRIPTION OF THE PREFERRED EMBODIMENTS

Figure 1:
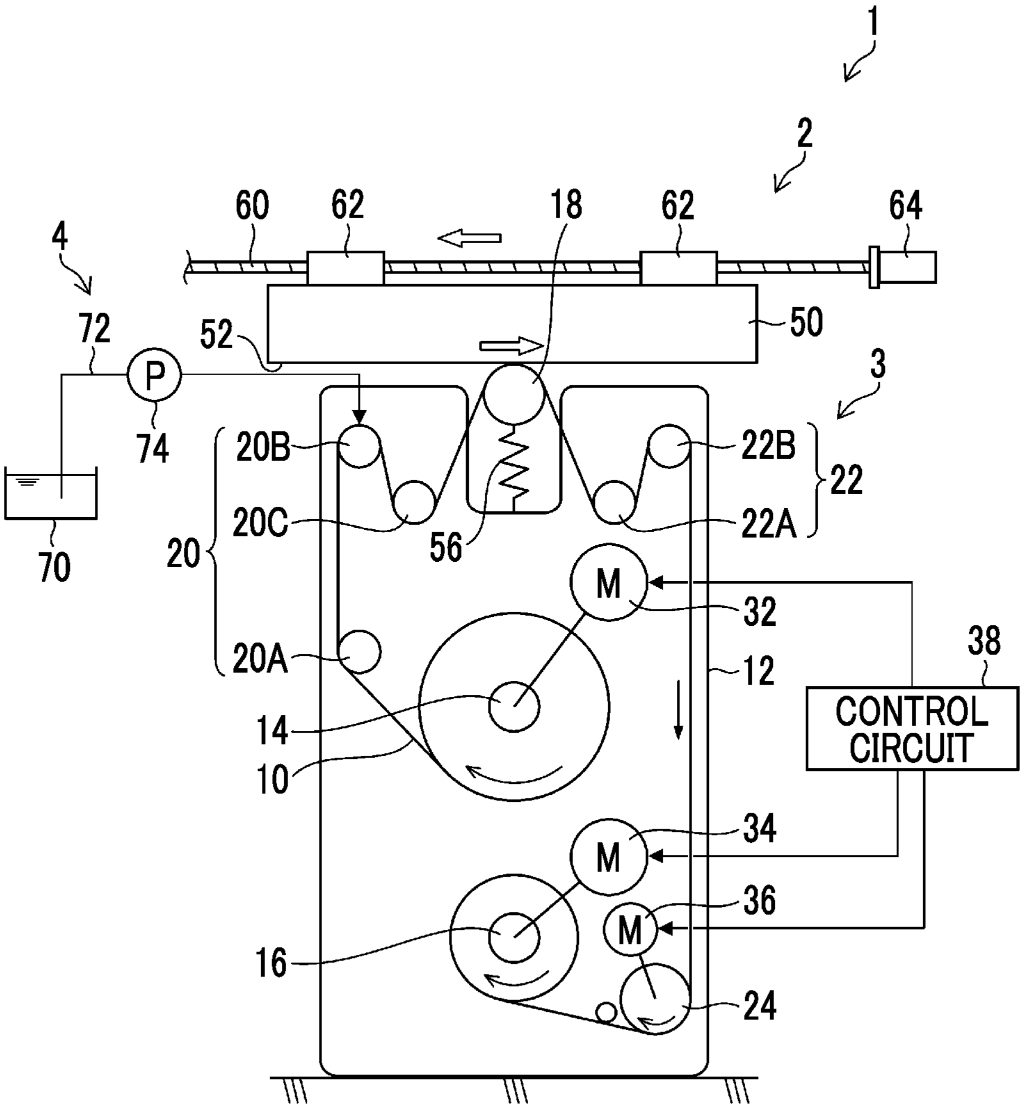
FIG. 1 is an overall configuration diagram of a head maintenance system according to an embodiment.

Hereinafter, preferred embodiments of the present invention will be described with reference to the accompanying drawings. In the present specification, the same components are denoted by the same reference numerals, and duplicate description thereof will be omitted as appropriate.

[Overall Configuration of Head Maintenance System]

FIG. 1 is an overall configuration diagram of a head maintenance system according to an embodiment. A head maintenance system 1 shown in FIG. 1 comprises a head moving device 2, a cleaning device 3, and a washing solution applying device 4.

The head moving device 2 supports an ink jet head 50 and moves the ink jet head 50 along a head moving direction. FIG. 1 illustrates an aspect in which a ball screw 60, a carriage 62, and a head moving motor 64 are provided, as a configuration example of the head moving device 2. The head moving device 2 described in the embodiment is an example of a component of a relative movement device.

The carriage 62 is movably attached to the ball screw 60. The ink jet head 50 is connected to the carriage 62. A rotation shaft of the head moving motor 64 is connected to the ball screw 60.

The ball screw 60 rotates in accordance with the drive of the head moving motor 64, and the carriage 62 moves along the ball screw 60 in accordance with the rotation of the ball screw 60. Accordingly, the ink jet head 50 connected to the carriage 62 can move along the head moving direction in a case of wiping the nozzle surface 52.

The ink jet head 50 shown in FIG. 1 moves from the right to the left in FIG. 1 in a case of wiping the nozzle surface 52. An arrow line illustrated in the vicinity of the ink jet head 50 indicates the head moving direction in a case of wiping the nozzle surface 52.

FIG. 1 illustrates the ink jet head 50 of a line type. A moving direction of the ink jet head 50 shown in FIG. 1 is a direction along a longitudinal direction of the ink jet head 50. The head maintenance system 1 may be applied to a serial type ink jet head.

The cleaning device 3 makes a web 10 abut on the nozzle surface 52 of the ink jet head 50 that moves along the head moving direction, and presses the web 10 against the nozzle surface 52 to wipe the nozzle surface 52.

The cleaning device 3 comprises the web 10, a case 12, a supply shaft 14, a winding shaft 16, a pressing roller 18, a pre-stage guide portion 20, a post-stage guide portion 22, and a feed roller 24. The cleaning device 3 comprises a supply shaft rotary drive motor 32, a winding shaft rotary drive motor 34, a feed roller rotary drive motor 36, and a control circuit 38. The cleaning device 3 described in the embodiment is an example of a wiping device.

A strip-shaped sheet material having absorbency is applied to the web 10. A fiber cloth, a woven fabric, a knitted fabric, and a nonwoven fabric can be applied in a manufacturing method of the web 10. As a material of the web 10, polyester, nylon, and cellulosic fibers can be applied.

A diameter smaller than a diameter of a nozzle provided in the ink jet head 50 may be applied to the fiber applied to the web 10. Examples of the diameter of the fiber applied to the web 10 include a range of 1.0 micrometer or more and 5.0 micrometer or less.

A width of the web 10 corresponds to a width of the nozzle surface 52 of the ink jet head 50 in a lateral direction. For example, the same width as the width of the nozzle surface 52 in the lateral direction may be applied to the width of the web 10. In addition, a width larger than the width of the nozzle surface 52 in the lateral direction may be applied to the width of the web 10.

The same width is not limited to a case in which the widths are exactly equal to each other, and may include an allowable range that can be regarded as substantially the same width. The width of the nozzle surface 52 of the ink jet head 50 in the lateral direction is a width of the nozzle surface 52 in a direction orthogonal to the longitudinal direction of the ink jet head 50, which is the moving direction of the ink jet head 50. Note that the width of the web 10 is not limited to the above example. The web 10 described in the embodiment is an example of a wiping sheet.

The case 12 is a housing in which the web 10 is accommodated. The case 12 comprises a bearing that supports the supply shaft 14, and a bearing that supports the winding shaft 16 and the like. The bearing provided in the case 12 is not shown.

The supply shaft 14 is rotatably supported using the bearing provided in the case 12. A reel is attachably and detachably mounted on the supply shaft 14. The web 10 is wound around a reel in a roll shape and mounted on the supply shaft 14. The supply shaft 14 is connected to a rotation shaft of the supply shaft rotary drive motor 32 and rotates in accordance with the drive of the supply shaft rotary drive motor 32.

The winding shaft 16 is rotatably supported using the bearing provided in the case 12. A reel is attachably and detachably mounted on the winding shaft 16. The winding shaft 16 is connected to a rotation shaft of the winding shaft rotary drive motor 34 and rotates in accordance with the drive of the winding shaft rotary drive motor 34. The web 10 is wound around the reel mounted on the winding shaft 16 in a roll shape. The reel provided in the supply shaft 14 and the reel provided in the winding shaft 16 are not shown.

The pressing roller 18 is a roller that presses the nozzle surface 52 by making the web 10 abut on the nozzle surface 52. The pressing roller 18 is rotatably and vertically movably supported by a shaft support member provided in the case 12. The shaft support member is not shown.

The pressing roller 18 is located in an upward direction of the cleaning device 3 in FIG. 1, and is supported using the shaft support member in a state of being biased in a direction of pressing the nozzle surface 52. The pressing roller 18 is biased in the upward direction by a spring 56.

A traveling path of the web 10 is set such that the web 10 is wound around a peripheral surface on an upper side of the pressing roller 18. The web 10 abuts on the nozzle surface 52 of the ink jet head 50 using the pressing roller 18 and presses the nozzle surface 52. That is, the pressing roller 18 and the spring 56 function as a pressing device that applies pressure to the web 10.

The pre-stage guide portion 20 guides the traveling of the web 10 between the supply shaft 14 and the pressing roller 18. The pre-stage guide portion 20 comprises a guide roller 20A, a guide roller 20B, and a guide roller 20C as guide members.

Each of the guide roller 20A, the guide roller 20B, and the guide roller 20C is disposed at a specified position of the case 12. The guide roller 20A, the guide roller 20B, and the guide roller 20C are rotatably supported using the bearing provided in the case 12.

The web 10 is wound around the guide roller 20A, the guide roller 20B, and the guide roller 20C, and travels between the supply shaft 14 and the pressing roller 18. The bearing that supports the guide roller 20A and the like is not shown. An arrow line given in the vicinity of the web 10 indicates a traveling direction of the web 10. The traveling direction of the web 10 is a direction opposite to the moving direction of the ink jet head 50 in a region where the nozzle surface 52 and the web 10 come into contact with each other.

The post-stage guide portion 22 guides the traveling of the web 10 at a position between the pressing roller 18 and the feed roller 24. The post-stage guide portion 22 comprises a guide roller 22A and a guide roller 22B as guide members. Each of the guide roller 22A and the guide roller 22B is disposed at a specified position of the case 12. The guide roller 22A and the guide roller 22B are rotatably supported using the bearing provided in the case 12. The bearing that supports the guide roller 22A and the like is not shown.

The number of the guide rollers provided in the pre-stage guide portion 20 and the guide rollers provided in the post-stage guide portion 22 and the positions where these guide rollers are disposed are appropriately adjusted according to the positions where the supply shaft 14, the winding shaft 16, and the pressing roller 18 are disposed.

The feed roller 24 feeds the web 10. The feed roller 24 is rotatably supported using the bearing provided in the case 12. The feed roller 24 is connected to a rotation shaft of the feed roller rotary drive motor 36 and rotates in accordance with the drive of the feed roller rotary drive motor 36. As a result, the web 10 wound around the feed roller 24 is fed. A nip roller is disposed at a position facing the feed roller 24. The nip roller is not shown.

The supply shaft rotary drive motor 32 is a power source for rotating the supply shaft 14. The supply shaft rotary drive motor 32 may be attached to the case 12 or may be disposed outside the case 12.

The supply shaft 14 rotates in accordance with the drive of the supply shaft rotary drive motor 32. In addition, the rotation of the supply shaft 14 is stopped in accordance with the stop of the drive of the supply shaft rotary drive motor 32. As a result, the feeding of the web 10 is stopped. That is, the supply shaft rotary drive motor 32 has a function of braking the web 10, and brakes the traveling of the web 10 on an upstream side of the pressing roller 18. An arrow line illustrated on the web 10 wound around the supply shaft 14 indicates a rotation direction of the supply shaft 14.

The winding shaft rotary drive motor 34 is a power source for rotating the winding shaft 16. The winding shaft rotary drive motor 34 may be attached to the case 12 or may be disposed outside the case 12. An arrow line illustrated on the web 10 wound around the winding shaft 16 indicates a rotation direction of the winding shaft 16.

The feed roller rotary drive motor 36 is a power source for rotating the feed roller 24. The feed roller rotary drive motor 36 may be attached to the case 12 or may be disposed outside the case 12. An arrow line illustrated on the feed roller 24 indicates a rotation direction of the feed roller 24.

The control circuit 38 controls the drive of each of the supply shaft rotary drive motor 32, the winding shaft rotary drive motor 34, and the feed roller rotary drive motor 36, and controls the traveling of the web 10. A mechanism for traveling the web 10, such as the supply shaft 14, the supply shaft rotary drive motor 32, and the pressing roller 18, described in the embodiment is an example of a component of a head moving device that relatively moves the ink jet head and the wiping sheet.

The head maintenance system 1 comprises the washing solution applying device 4. The washing solution applying device 4 comprises a washing solution tank 70, a washing solution flow passage 72, a washing solution pump 74, and a washing solution jetting nozzle. The washing solution jetting nozzle is not shown.

The washing solution applying device 4 drives the washing solution pump 74 to pump up the washing solution from the washing solution tank 70, and applies the washing solution to the web 10 via the washing solution flow passage 72 and the washing solution jetting nozzle. In the present embodiment, the aspect in which the washing solution is applied to the nozzle surface 52 via the web 10 has been illustrated, but the washing solution may be applied directly to the nozzle surface 52 from the washing solution applying device 4.

[Electric Configuration of Head Maintenance System]

Figure 2:
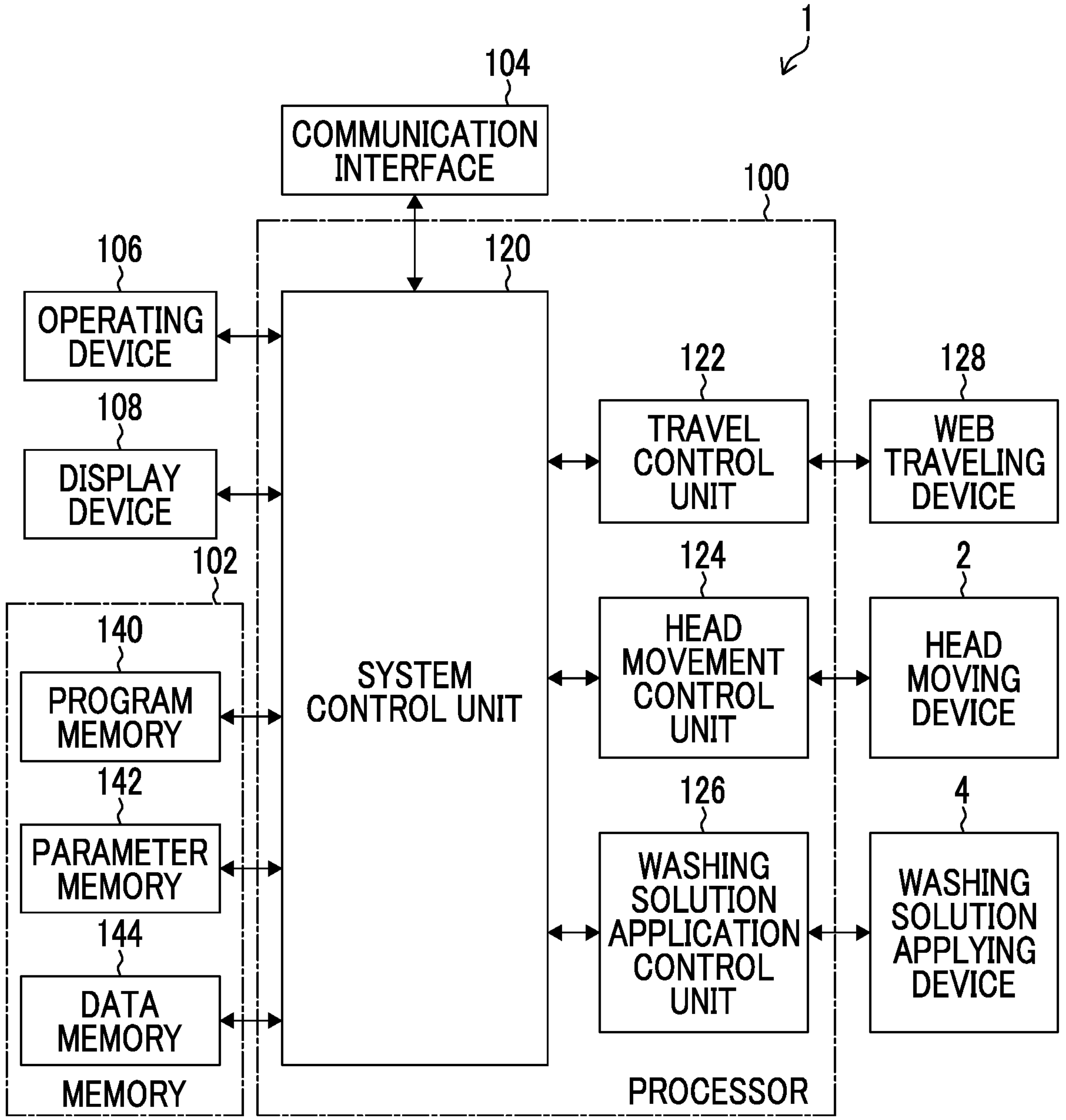
FIG. 2 is a functional block diagram showing an electric configuration of the head maintenance system shown in FIG. 1.

FIG. 2 is a functional block diagram showing an electric configuration of the head maintenance system shown in FIG. 1. The head maintenance system 1 comprises a processor 100 and a memory 102. The processor 100 executes various programs stored in the memory 102 to realize various functions in the head maintenance system 1. The term "program" is synonymous with the term "software".

The head maintenance system 1 comprises a communication interface 104. The communication interface 104 executes data communication with an external device based on a control of the processor 100. Various standards such as universal serial bus (USB) can be applied to the communication interface 104. As a communication form of the communication interface 104, either wired communication or wireless communication may be applied.

The head maintenance system 1 comprises an operating device 106. A keyboard, a mouse, or the like is applied to the operating device 106. A user may input various types of information using the operating device 106. The operating device 106 transmits signals representing various types of information input by the user to the processor 100. The processor 100 realizes various functions of the head maintenance system 1 based on the acquired signals.

The head maintenance system 1 comprises a display device 108. The display device 108 displays various types of information in the head maintenance system 1. A touch panel method may be applied to the display device 108 to integrally configure the operating device 106 and the display device 108.

The processor 100 comprises a system control unit 120, a travel control unit 122, a head movement control unit 124, and a washing solution application control unit 126. Each unit provided in the processor 100 corresponds to various functions of the head maintenance system 1.

The system control unit 120 integrally controls each unit provided in the head maintenance system 1. That is, the system control unit 120 transmits a command signal to various control units provided in the processor 100. The various control units execute a control of each unit based on the received command signal.

The travel control unit 122 operates a web traveling device 128 based on the command signal transmitted from the system control unit 120 to control the travel of the web 10. The web traveling device 128 shown in FIG. 2 includes the pre-stage guide portion 20, the post-stage guide portion 22, the feed roller 24, the supply shaft rotary drive motor 32, the winding shaft rotary drive motor 34, and the feed roller rotary drive motor 36, which are provided in the cleaning device 3 shown in FIG. 1. The web traveling device 128 may include the pressing roller 18.

The head movement control unit 124 operates the head moving device 2 based on the command signal transmitted from the system control unit 120 to control the movement of the ink jet head 50. The head movement control unit 124 includes the control circuit 38 shown in FIG. 1.

The washing solution application control unit 126 operates the washing solution applying device 4 based on the command signal transmitted from the system control unit 120 to execute a washing solution application control such as a control of an application amount of the washing solution per unit area to the nozzle surface.

The memory 102 comprises a program memory 140, a parameter memory 142, and a data memory 144. The program memory 140 stores instructions that configure various programs executed by the processor 100. The various programs correspond to various functions of the head maintenance system 1.

The parameter memory 142 stores various parameters corresponding to the various programs. In a case of executing the various programs, the processor 100 reads out parameters applied to the program from the parameter memory 142, applies the parameters, and executes the program.

The data memory 144 stores various types of data applied to the head maintenance system 1. The memory 102 includes an operation area used by the processor 100 in executing various operations.

A semiconductor element such as a read only memory (ROM) or a random access memory (RAM) can be applied to the memory 102. A magnetic storage medium such as a hard disk may be applied to the memory 102. The memory 102 may comprise a plurality of types of storage elements.

Here, examples of a hardware structure of the processor 100 include a central processing unit (CPU), a graphics processing unit (GPU), a programmable logic device (PLD), and an application specific integrated circuit (ASIC). The CPU is a general-purpose processor that executes a program and acts as various functional units. The GPU is a processor specialized in image processing.

The PLD is a processor capable of changing a configuration of an electric circuit after manufacturing a device. An example of the PLD is a field programmable gate array (FPGA). The ASIC is a processor comprising a dedicated electric circuit specifically designed to execute a specific process.

One processing unit may be configured of one of these various processors or may be configured of two or more processors of the same type or different types. Examples of a combination of various processors include a combination of one or more FPGAs and one or more CPUs, and a combination of one or more FPGAs and one or more GPUs. Another example of a combination of various processors includes a combination of one or more CPUs and one or more GPUs.

A plurality of functional units may be configured by using one processor. As an example of configuring a plurality of functional units by using one processor, there is an aspect in which, as typified by a computer such as a client or a server, one processor is configured by a combination of one or more CPUs and software such as a system on chip (SoC), and the processor is caused to act as a plurality of functional units.

As another example of configuring a plurality of functional units by using one processor, there is an aspect in which a processor that realizes functions of an entire system including a plurality of functional units by using one IC chip is used. Note that IC is an abbreviation for integrated circuit.

As described above, the various functional units are configured by using one or more of the above described various processors as a hardware structure. Furthermore, the hardware structure of the above described various processors is, more specifically, an electric circuit (circuitry) in which circuit elements such as semiconductor elements are combined.

[Detailed Description of Wiping of Nozzle Surface]

In the head maintenance system 1 according to the embodiment, the physical properties of the web 10 that wipes the nozzle surface 52 and the pressure at which the web 10 presses the nozzle surface 52 are specified, and cleaning is executed such that the web 10 is brought into contact with the nozzle surface 52. In addition, in the head maintenance system 1, the application amount of the washing solution per unit area of the nozzle surface is specified, and non-contact cleaning of the nozzle surface using a washing solution film formed on the nozzle surface 52 is executed.

As a result, preferable wiping performance in wiping the nozzle surface is maintained, and wiping of the nozzle surface 52 in which a damage to the nozzle surface 52 is suppressed is realized. The preferable wiping performance in wiping the nozzle surface means the wiping performance of the nozzle surface in which the occurrence of jetting abnormality of the ink jet head 50 caused by the attachment on the nozzle surface 52 is suppressed. In addition, in a case in which the water-repellent film is formed on the nozzle surface 52, the damage to the nozzle surface 52 is synonymous with the damage to the water-repellent film.

[Linearity of Compression of Web]

A linearity of compression LC measured using a compression tester is specified as the physical property of the web 10. Examples of the compression tester include a compression tester KES-FB3-A manufactured by Kato Tech Co., Ltd.

The linearity of compression LC is an index showing softness of the web 10 itself. The web 10 having relatively small linearity of compression LC is relatively soft, and tends to be difficult to remove dried ink mist adhering to the nozzle surface 52.

On the other hand, the web 10 having relatively large linearity of compression LC is relatively hard, and tends to easily damage the nozzle surface 52. Therefore, in the head maintenance system 1 according to the present embodiment, a value of the linearity of compression LC of the web 10 is specified as a range of 0.3 or more and 0.6 or less. As a result, the wiping of the nozzle surface 52 is realized, in which both the maintenance of the preferable wiping performance of the nozzle surface 52 and the suppression of the damage on the nozzle surface 52 are achieved.

Figure 3:
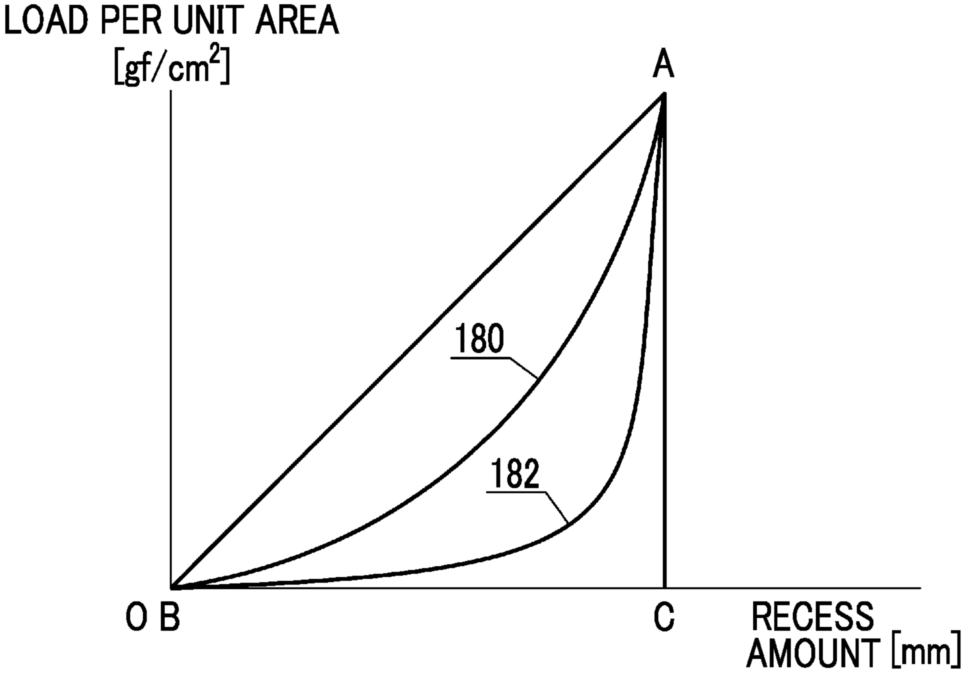
FIG. 3 is an explanatory diagram of linearity of compression of a web applied to the head maintenance system shown in FIG. 1.

FIG. 3 is an explanatory diagram of the linearity of compression of the web applied to the head maintenance system shown in FIG. 1. FIG. 3 illustrates a graph showing a relationship between a recess amount of the web 10 and a load per unit area applied to the web 10.

A curve 180 shown in FIG. 3 represents a locus of a recess amount of the web 10 in a case in which a load per unit area applied to the web 10 is increased from a minimum value of the load to a maximum value of the load. A curve 182 represents a locus of a recess amount of the web 10 in a case in which a load per unit area applied to the web 10 is decreased from the maximum value of the load to the minimum value of the load.

The linearity of compression LC is calculated by adding an area of a region surrounded by the curve 182, a straight line BC, and a straight line AC to an area of a region surrounded by the curve 180 and the curve 182 and dividing the added value by an area of a region surrounded by a straight line AB, the straight line BC, and the straight line AC.

[Evaluation of Linearity of Compression]

An evaluation experiment was executed and verified for the linearity of compression LC applied to the web 10. Evaluation items in the evaluation experiment were the wiping performance of the nozzle surface 52 and the damage on the nozzle surface 52. The wiping performance of the nozzle surface 52 was determined from the viewpoint of maintaining jetting performance and removing firmly-adhering ink. A condition of the evaluation experiment, a method of the evaluation experiment, and a result of the evaluation experiment are as follows.

<Condition of Evaluation Experiment>

As the ink jet head 50, a line-type ink jet head of a piezoelectric jetting method is applied. The piezoelectric ink jet head comprises a piezoelectric element as a jetting force generating element, and jets ink from a nozzle opening by using a deflection deformation of a thick element. The ink jet head 50 has a structure in which a plurality of nozzle openings are arranged in a matrix. Each of the plurality of nozzle openings communicates with a liquid chamber provided with the piezoelectric element.

As the web 10, seven types of webs having different values of the linearity of compression LC were applied. For the web 10, three webs N1, N2, and N3 were applied to each of the seven types of webs.

Figure 4:
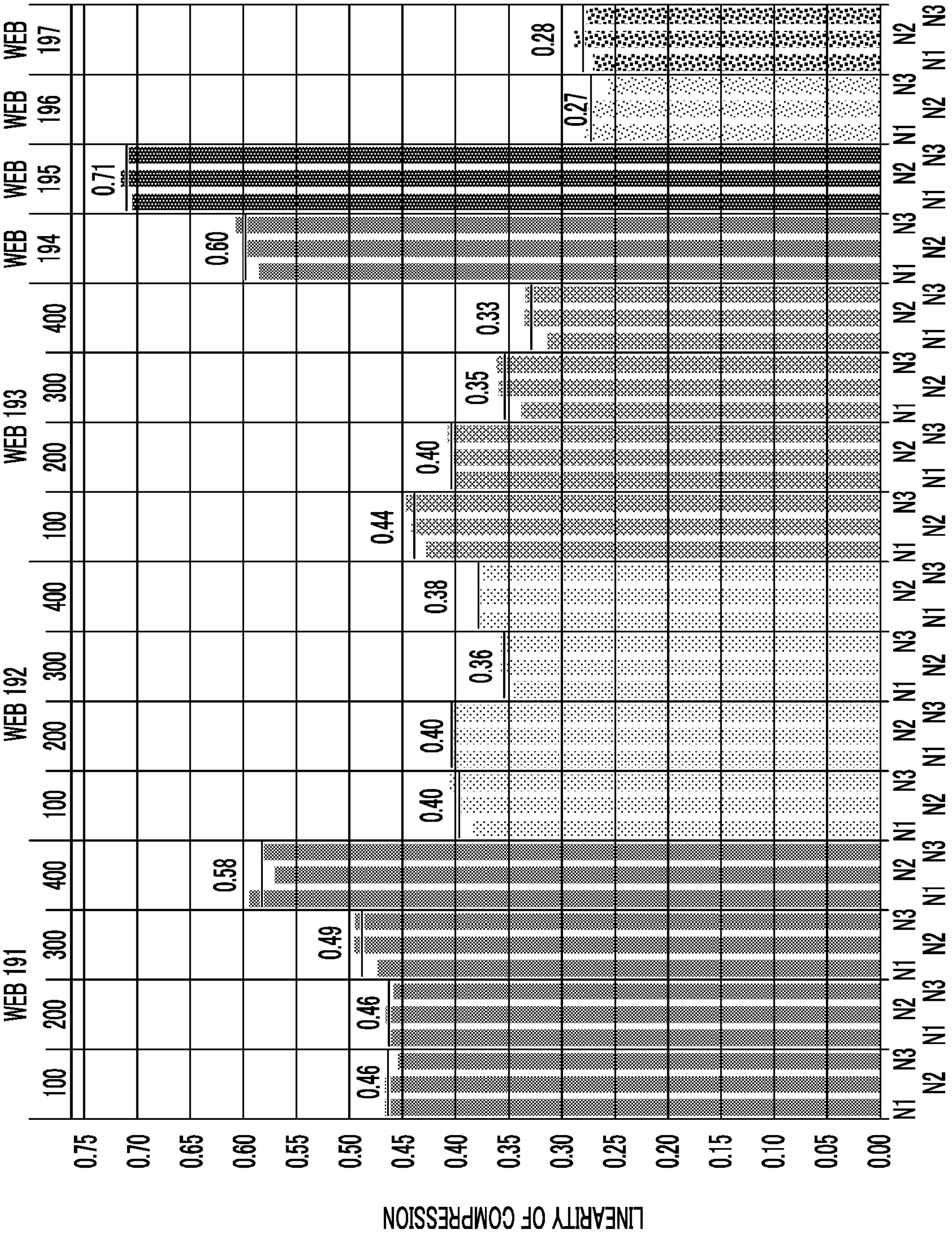
FIG. 4 is a graph showing linearity of compression for each web.

FIG. 4 is a graph showing the linearity of compression for each web. Three pieces of each of web 191 to the web 197 were prepared, and the value of the linearity of compression LC was calculated by changing an upper limit load. Here, the term "web" without reference numeral represents any one of the web 10 shown in FIG. 1 and the web 191 to the web 197 or a generic term for the web 10 and the web 191 to the web 197.

For the upper limit loads of the web 191, the web 192, and the web 193, 100 gf, 200 gf, 300 gf, and 400 gf were applied. For the upper limit load of the web 194, the web 195, the web 196, and the web 197, 100 gf was applied. The numerical values shown in the graph are average values of the linearity of compression LCs in the three webs for each upper limit load.

The average value of the linearity of compression LC of the web 191 is in a range of 0.46 or more and 0.58 or less. The average value of the linearity of compression LC of the web 192 is in a range of 0.36 or more and 0.40 or less. The average value of the linearity of compression LC of the web 193 is in a range of 0.33 or more and 0.44 or less.

On the other hand, the average value of the linearity of compression LC of the web 194 is 0.60, the average value of the linearity of compression LC of the web 195 is 0.71, the average value of the linearity of compression LC of the web 196 is 0.27, and the average value of the linearity of compression LC of the web 197 is 0.28.

<Method of Evaluation Experiment>

Dummy jets of 10,000 shots are executed from each of all the nozzles of the ink jet head 50 to make ink adhere to the nozzle surface 52 of the ink jet head 50.

The web to be evaluated is pressed against the nozzle surface 52. Pressure applied to the pressing of the nozzle surface 52 is 16 kilopascals. The web is caused to travel, the ink jet head 50 is moved, and the nozzle surface 52 is wiped using the web. As a moving speed of the ink jet head 50, a plurality of speeds in a range of 8 millimeters per second to 80 millimeters per second are applied. As a traveling speed of the web, 3.2 millimeters per second is applied. The term "speed" may include the meaning of a speed expressed using an absolute value of a speed.

It has been confirmed that the same result can be obtained in the range of the moving speed of the ink jet head 50 described above. FIG. 5 shows evaluation results in a case in which the moving speed of the ink jet head 50 is 40 millimeters per second.

Immediately after the wiping of the nozzle surface 52 is completed, measurement of jetting deflection of each nozzle and confirmation of the removal of the firmly-adhering ink on the nozzle surface 52 are executed. The firmly-adhering ink is cured or semi-cured ink, and represents ink that does not naturally drop from the nozzle surface 52.

In addition, immediately after the first wiping of the nozzle surface 52 and immediately after the final wiping of the nozzle surface 52, the confirmation of a damage to the nozzle surface 52 is executed. A known method is applied to the measurement of the jetting deflection. Visual inspection is applied to the confirmation of the removal of the firmly-adhering ink on the nozzle surface 52 and the confirmation of the damage to the nozzle surface 52. The visual inspection referred to here includes an aspect of observing the nozzle surface 52 by magnifying the nozzle surface 52 using a microscope or the like.

The dummy jet, the wiping of the nozzle surface 52, and the evaluation immediately after the wiping of the nozzle surface 52 are regarded as one set of processing, and one set of processing is executed 1000 times. The target of the evaluation immediately after the wiping of the nozzle surface 52 is all the nozzles provided in the ink jet head 50.

<Result of Evaluation Experiment>

FIG. 5 is a graph showing results of the evaluation experiment. ++ in the evaluation of the jetting deflection represents non-occurrence of the jetting deflection in which the number of nozzles in which the jetting deflection exceeding a specified value was generated is 0. + in the evaluation of the jetting deflection represents a case in which the number of nozzles in which the jetting deflection exceeding a specified value was generated is 1. – in the evaluation of the jetting deflection represents a case in which the number of nozzles in which the jetting deflection exceeding a specified value was generated is 2 or more. As the criterion for determining the jetting deflection, 70% of a distance between dots corresponding to a printing resolution is applied.

++ in the evaluation of the firmly-adhering ink removal represents a case in which a diameter of the firmly-adhering ink adhering to the nozzle surface 52 is 25% or less of a diameter of a dot having the minimum size. + in the evaluation of the firmly-adhering ink removal represents a case in which a diameter of the firmly-adhering ink adhering to the nozzle surface 52 is more than 25% and equal to or less than 50% of a diameter of a dot having the minimum size.

– in the evaluation of the firmly-adhering ink removal represents a case in which a diameter of the firmly-adhering ink adhering to the nozzle surface 52 is more than 50% of a diameter of a dot having the minimum size. In a case in which there are a plurality of firmly-adhering inks, a representative value in the plurality of firmly-adhering inks can be applied to a size of the firmly-adhering ink. As the representative value, a maximum value, an average value, or the like can be applied.

++ in the evaluation of the damage to the nozzle surface represents a case in which no damage was visually recognized around each nozzle. – in the evaluation of the damage to the nozzle surface represents a case in which a damage was visually recognized around one or more nozzles. The term "around the nozzle" was defined as a region from an edge of the nozzle opening to a distance corresponding to 10% of a diameter of the nozzle opening.

In the web 196 and the web 197 in which the value of the linearity of compression LC is less than 0.33, the evaluation of the damage to the nozzle surface is ++, but the evaluation of the jetting deflection and the evaluation of the firmly-adhering ink removal is –. In the web 196 and the web 197 in which the value of the linearity of compression LC is less than 0.33, it is difficult to obtain the required wiping performance of the nozzle surface 52.

In the web 192 and the web 193 in which the value of the linearity of compression LC is 0.33 or more and less than 0.44, the evaluation of the jetting deflection and the evaluation of the firmly-adhering ink removal are +, and the evaluation of the damage to the nozzle surface is ++. In the web 192 and the web 193 in which the value of the linearity of compression LC is 0.33 or more and less than 0.44, it is possible to achieve both the securing of the wiping performance of the nozzle surface 52 and the suppression of the damage to the nozzle surface.

In the web 191 in which the value of the linearity of compression LC is 0.44 or more and less than 0.60, the evaluation of the jetting deflection is ++, the evaluation of the firmly-adhering ink removal is +, and the evaluation of the damage to the nozzle surface is ++. In the web 191 in which the value of the linearity of compression LC is 0.44 or more and less than 0.60, it is possible to achieve both the securing of the wiping performance of the nozzle surface 52 and the suppression of the damage to the nozzle surface.

In the web 194 and the web 195 in which the value of the linearity of compression LC is 0.60 or more, the evaluation of the jetting deflection is + and the evaluation of the firmly-adhering ink removal is ++, but the evaluation of the damage to the nozzle surface is −. In the web 194 and the web 195 in which the value of the linearity of compression LC is less than 0.60, it is difficult to suppress the damage to the nozzle surface.

That is, the value of the linearity of compression LC of the web 10 in which the securing of the wiping performance of the nozzle surface 52 and the suppression of the damage to the nozzle surface are realized is in a range of 0.33 or more and less than 0.60. Here, in consideration of an operation error or the like in deriving the linearity of compression LC, a second decimal place in a lower limit value of the linearity of compression LC is rounded off, and the value of the linearity of compression LC is set to a range of 0.3 or more and less than 0.60.

[Evaluation of Change with Time of Nozzle Surface]

An evaluation experiment was executed to verify a change with time of the nozzle surface 52. The change with time of the nozzle surface 52 means a change in jetting characteristics of the ink jet head 50 and the presence or absence of a damage to the nozzle surface 52 in a case in which a wiping treatment is executed 3000 times or more. Conditions of the evaluation experiment of the change with time of the nozzle surface are based on the evaluation experiment of the linearity of compression LC described above.

The web 191, the web 192, and the web 193 in which the value of the linearity of compression LC is in a range of 0.3 or more and less than 0.60 are evaluation targets. Among the web 191, the web 192, and the web 193, the web 191 having the largest linearity of compression, which is the most severe with respect to the change with time of the nozzle surface 52, was used in the evaluation experiment. A method of the evaluation experiment of the change with time of the nozzle surface and a result of the evaluation experiment are shown below.

<Method of Evaluation Experiment>

Dummy jets of 10,000 shots are executed from each of all the nozzles of the ink jet head 50 to make ink adhere to the nozzle surface 52 of the ink jet head 50.

The web 10 is pressed against the nozzle surface 52. The web 10 is caused to travel, the ink jet head 50 is moved, and the nozzle surface 52 is wiped using the web 10. As the pressure for pressing the web 10 against the nozzle surface 52, 5 kilopascals and 20 kilopascals are applied. The moving speed of the ink jet head 50 is 40 millimeters per second. The traveling speed of the web 10 is 3.2 millimeters per second.

The dummy jet and the wiping of the nozzle surface 52 are regarded as one set of processing, and one set of processing is executed 6000 times. An evaluation of a change in landing position is executed every 1000 times of one set of processing. The target of the evaluation of the change in landing position is all the nozzles provided in the ink jet head 50.

A standard deviation σ of an error of the landing position of all the nozzles is calculated. A deterioration rate is calculated for each number of times of the wiping, assuming that a deterioration rate in a case in which a value of σ deteriorates by 1.5 times as the number of times of the wiping increases is 50%. Here, the deterioration rate represents a degree of deterioration in the jetting performance of the ink jet head 50.

<Result of Evaluation Experiment>

Figure 6:
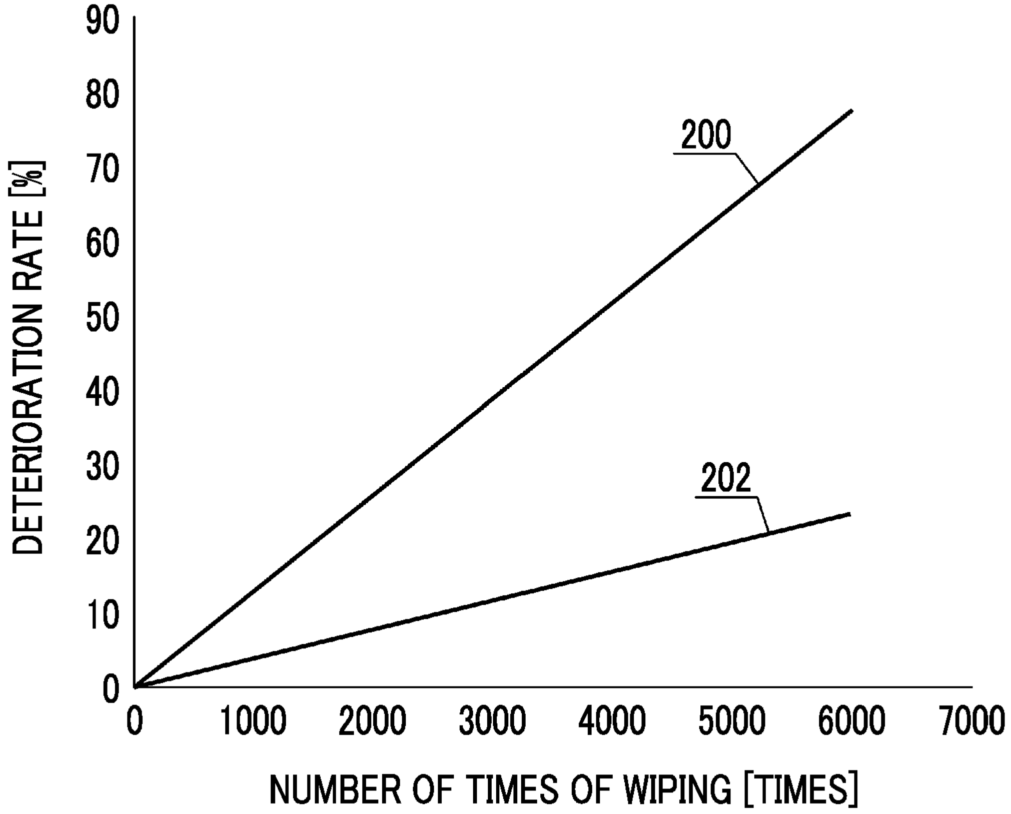
FIG. 6 is a graph showing results of an evaluation experiment of a change with time of a nozzle surface.

FIG. 6 is a graph showing results of the evaluation experiment of the change with time of the nozzle surface. FIG. 6 shows a regression line showing transition of the deterioration rate using a graph format. A horizontal axis of the graph shown in FIG. 6 represents the number of times of wiping. A vertical axis of the graph shown in FIG. 6 represents the deterioration rate.

A straight line 200 shown in FIG. 6 represents the transition of the deterioration rate with respect to the number of times of wiping in a case in which the pressure applied to the web is 20 kilopascals. A straight line 202 represents the transition of the deterioration rate with respect to the number of times of wiping in a case in which the pressure applied to the web is 5 kilopascals.

The straight line 200 and the straight line 202 represent that the deterioration rate increases as the number of times of wiping increases. In addition, the straight line 200 and the straight line 202 represent that an increase in the deterioration rate is promoted in a case in which the pressure applied to the web is relatively large.

For example, in a case in which the pressure applied to the web represented by the straight line 200 is 20 kilopascals or less, the deterioration rate in a case in which the wiping of the nozzle surface 52 is executed 6000 times or less can be suppressed to 80% or less.

In addition, in a case in which the pressure applied to the web represented by the straight line 202 is 5 kilopascals or less, the deterioration rate in a case in which the wiping of the nozzle surface 52 is executed 6000 times or less can be suppressed to 20% or less. Accordingly, in a case in which the wiping treatment of the nozzle surface 52 is executed 6000 times or less, the jetting performance of the ink jet head 50 can be secured.

[Evaluation of Effect of Wiping Strength on Landing Position]

An evaluation experiment was executed to verify the effect of the wiping strength on the landing position. The wiping strength represents a degree of deformation of the web in a case in which the web presses the nozzle surface 52. As an index value of the wiping strength, dT/T0, which represents a ratio of a pushing amount dT of the web in a case in which the web is pressed with optional pressure to a thickness T0 of the web in a non-pressing case, is applied.

The point of the evaluation experiment of the effect of the wiping strength on the landing position is mainly to suppress the damage to the nozzle surface 52. A method of the evaluation experiment of the influence of the wiping strength on the landing position and a result of the evaluation experiment are shown below.

<Method of Evaluation Experiment>

For each of the web 191 and the web 192 shown in FIG. 4, the pushing amount dT of the web in a case in which the pressure applied to the web is 5 kilopascals is derived, and the index value dT/T0 is calculated. A plot corresponding to the index value dT/T0 of the web 191 and a plot corresponding to the index value dT/T0 of the web 192 are obtained. Linear interpolation is performed between the two points to derive a straight line representing a relationship with the index value dT/T0 for the linearity of compression LC in a case in which the pressure applied to the web is 5 kilopascals.

Similarly, for each of the web 191 and the web 192, the pushing amount dT of the web in a case in which the pressure applied to the web is 20 kilopascals is derived, and the index value dT/T0 is calculated. A plot corresponding to the index value dT/T0 of the web 191 and a plot corresponding to the index value dT/T0 of the web 192 are obtained. Linear interpolation is performed between the two points to derive a straight line representing a relationship with the index value dT/T0 for the linearity of compression LC in a case in which the pressure applied to the web is 20 kilopascals.

Here, for the derivation of the pushing amount dT of the web, calculation using a function representing a relationship between the pressure applied to the web and the recess amount of the web may be applied, or measurement using the web may be applied.

<Result of Evaluation Experiment>

Figure 7:
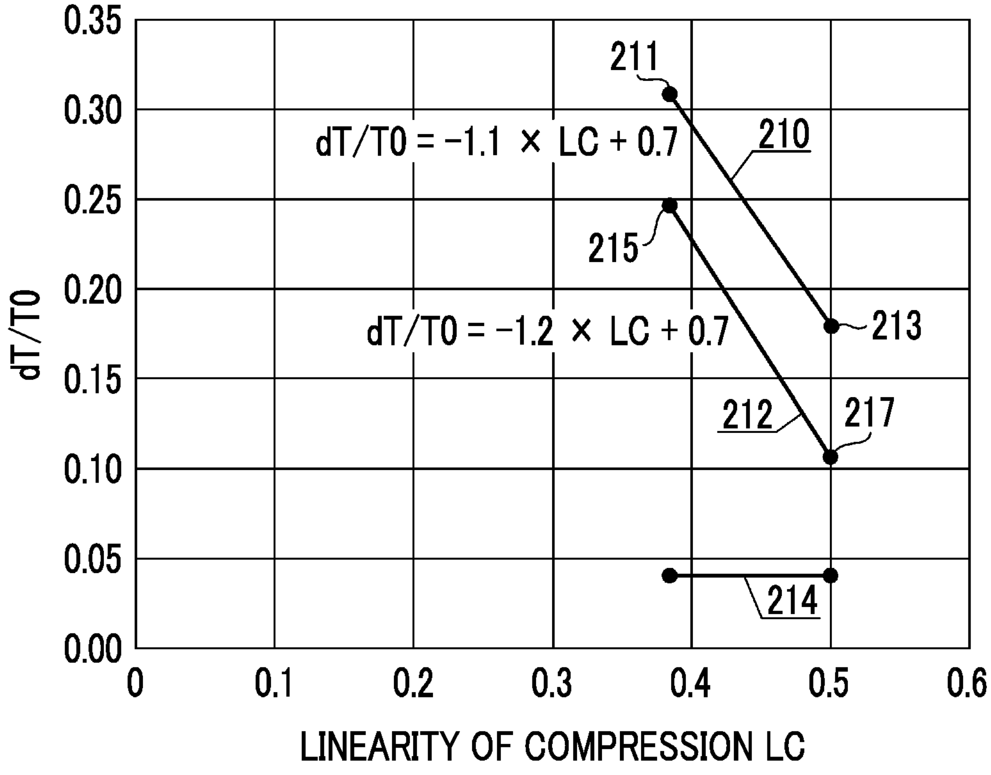
FIG. 7 is a graph showing a relationship between linearity of compression and a web pushing amount.

FIG. 7 is a graph showing a relationship between the linearity of compression and the web pushing amount. In the graph shown in FIG. 7, a horizontal axis represents the linearity of compression LC, and a vertical axis represents the index value dT/T0. A straight line 210 represents a case in which the pressure applied to the web is 20 kilopascals. In addition, a straight line 212 represents a case in which the pressure applied to the web is 5 kilopascals.

The straight line 210 including a plot 211 and a plot 213 is represented as $dT/T0=-1.1\times LC+0.7$. The straight line 212 including a plot 215 and a plot 217 is represented as $dT/T0=-1.2\times LC+0.7$. A straight line 214 represents $dT/T0=0.04$.

In a range where the value of the linearity of compression LC is in a range of 0.30 or more and less than 0.60, in a case of $dT/T0>-1.1\times LC+0.7$, it is difficult to suppress the damage to the nozzle surface 52. On the other hand, in a range where the value of the linearity of compression LC is in a range of 0.30 or more and less than 0.60, in a case of $dT/T0\leq-1.1\times LC+0.7$, it is possible to suppress the damage to the nozzle surface 52. Further, in a case in which the index value dT/T0 is $-1.2\times LC+0.7\leq dT/T\leq-1.1\times LC+0.7$, it is possible to further suppress the damage to the nozzle surface 52.

Here, in a case in which the thickness T0 of the web in the non-pressing case is 0.3 millimeters and the index value dT/T0 is about 0.04, there is a need to control the pushing amount dT of the web while securing an accuracy of about 0.01 millimeters. In that case, it is difficult to secure the stability of the mechanism that supports the web 10 in a case in which the nozzle surface 52 is wiped. Therefore, the index value dT/T0 of the web 10 shown in FIG. 1 is preferably 0.04 or more.

The thickness T0 of the web in non-pressing case described in the embodiment is an example of an uncompressed thickness T0 in a case in which specified pressure is not applied. The pushing amount dT of the web in a case in which the web is pressed with optional pressure according to the embodiment is an example of a compressed thickness dT in a case in which specified pressure is applied.

[Compression Workload of Web]

In the head maintenance system 1 shown in FIG. 1, a compression workload WC measured using a compression tester is specified as the physical property of the web 10. The compression workload WC is an index value of the web 10 indicating that the larger the value, the more easily the web 10 is compressed.

As the value of the compression workload WC increases, the absorbency of the washing solution becomes better, and the retention amount of the washing solution per unit area of the web 10 in a case in which a specified amount of the washing solution is applied to the nozzle surface 52 relatively increases. In order to retain a specified amount of the washing solution on the nozzle surface 52, an application amount of the washing solution applied to the web 10 is adjusted according to the value of the compression workload WC of the web 10.

In a case in which the washing solution having an amount less than a specified amount is retained on the nozzle surface 52, a state similar to the wiping of the nozzle surface 52 using the web 10 in a dry state is achieved, and there is a concern that the nozzle surface 52 may be damaged. In addition, there is a concern that a meniscus surface may be disturbed because of leakage of ink from the nozzle opening.

On the other hand, in a case in which the washing solution having an amount exceeding a specified amount is retained on the nozzle surface 52, there is a concern that jetting abnormality may occur because of the residual washing solution on the nozzle surface 52 after the wiping of the nozzle surface 52.

The compression workload WC is calculated by adding the area of the region surrounded by the curve 182, the straight line BC, and the straight line AC to the area of the region surrounded by the curve 180 and the curve 182 shown in FIG. 3. Specifically, the compression workload WC can calculate the compression workload WC by multiplying the pressure applied to the web 10 by the pushing amount dT of the web 10. The unit of the compression workload WC is a gram-force per centimeter.

In the following, an evaluation experiment is executed to verify the compression workload WC and the application amount of the washing solution of the web 10 from the viewpoint of evaluating an image quality in printing executed after the wiping of the nozzle surface 52. The application amount of the washing solution is a volume per unit area, and the unit is milliliter per square centimeter.

[Evaluation of Compression Workload of Web and Application Amount of Washing Solution]

Conditions of the evaluation experiment of the compression workload of the web and the application amount of the washing solution are as follows.

<Condition of Evaluation Experiment>

Paper (manufactured by Oji Paper Co., Ltd., OK Topcoat+ (trade name), a basis weight of 157 gsm, and a size of 750 millimeters ×530 millimeters) was applied. gsm is an abbreviation for grams per square meter. Other conditions of the evaluation experiment, such as a type of the web, are based on those of the evaluation experiment of the linearity of compression LC.

<Method of Evaluation Experiment>

A printing sequence is as follows. The wiping of the nozzle surface 52 is executed. The pressure applied to the nozzle surface 52 is 16 kilopascals. After that, dummy jets of 10,000 shots are executed for all the nozzles to make ink adhere to the nozzle surface 52. After the end of the dummy jet, the ink jet head 50 is set to a non-operation state. A non-operating period of the ink jet head 50 is one hour.

After the end of the non-operating period of the ink jet head 50, the nozzle surface 52 is wiped. The wiping conditions are based on those before the dummy jet is executed. After wiping the nozzle surface 52, a print condition of 4C100% is applied to print 500 solid images.

Here, the print condition of 4C100% means that, in a CMYK display, a coverage of C, a coverage of M, a coverage of Y, and a coverage of K are each 100%. C, M, Y, and K represent cyan, magenta, yellow, and black, respectively.

The printing sequence described above is executed for three types of webs having values of the compression workload WC of 0.03 gram-force per centimeter, 0.21 gram-force per centimeter, and 0.59 gram-force per centimeter. In addition, the printing sequence for each web with different compression workload WC is execute by changing the application amount of the washing solution stepwise in a range of 0 milliliters per square centimeter or more and 0.45 milliliters per square centimeter or less.

The presence or absence of streaks on the printed solid image is visually inspected. The visual inspection may include an aspect in which the solid image is magnified and observed using a microscope or the like.

<Result of Evaluation Experiment>

In a case in which the number of solid images in which the streaks are visually recognized is one or less out of 500 solid images, good determination is made. On the other hand, in a case in which the number of solid images in which the streaks are visually recognized is two or more out of 500 solid images, failure determination is made.

Figure 8:
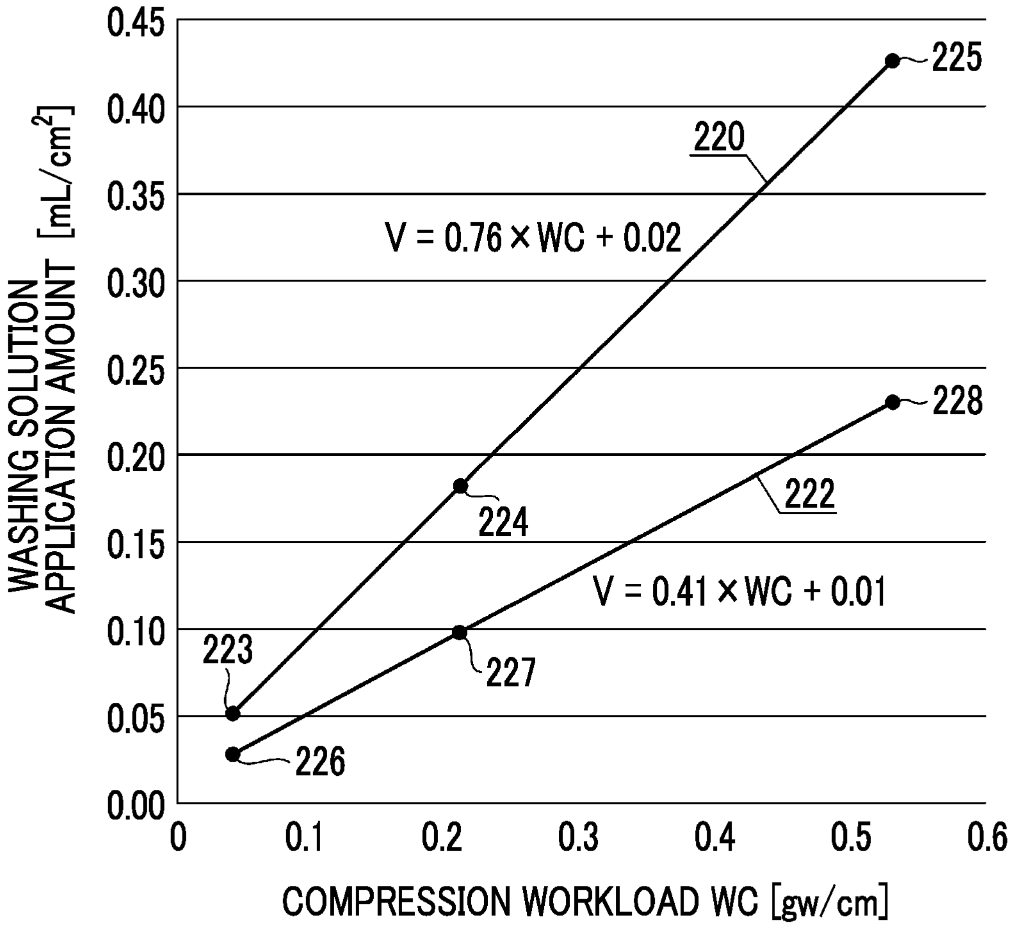
FIG. 8 is a graph showing evaluation results of a compression workload of a web and an application amount of a washing solution.

FIG. 8 is a graph showing evaluation results of the compression workload of the web and the application amount of the washing solution. FIG. 8 shows a relationship between the compression workload WC and the washing solution application amount. In the graph shown in FIG. 8, a horizontal axis represents the compression workload WC, and a vertical axis represents the washing solution application amount.

A straight line 220 is derived by linear interpolation between a plot 223, a plot 224, and a plot 225 of three points. The plot 223 represents an upper limit value of the washing solution application amount in a case in which the value of the compression workload WC is 0.03 gram-force per centimeter.

Similarly, the plot 224 represents an upper limit value of the washing solution application amount in a case in which the value of the compression workload WC is 0.21 gram-force per centimeter. The plot 225 represents an upper limit value of the washing solution application amount in a case in which the value of the compression workload WC is 0.59 gram-force per centimeter. The application amount of the washing solution is denoted by V, and the straight line 220 is represented as $V=0.76\times WC+0.02$.

A straight line 222 is derived by linear interpolation between a plot 226, a plot 227, and a plot 228 of three points. The plot 226 represents a lower limit value of the washing solution application amount in a case in which the value of the compression workload WC is 0.03 gram-force per centimeter.

Similarly, the plot 227 represents a lower limit value of the washing solution application amount in a case in which the value of the compression workload WC is 0.21 gram-force per centimeter. The plot 228 represents a lower limit value of the washing solution application amount in a case in which the value of the compression workload WC is 0.59 gram-force per centimeter. The straight line 222 is represented by $V=0.41\times WC+0.01$.

That is, in a case in which a web in which the value of the compression workload WC is 0.03 gram-force per centimeter or more and 0.59 gram-force per centimeter or less is applied, a range of $0.41\times WC+0.01$ milliliters per square centimeter or more and $0.76\times WC+0.02$ milliliters per square centimeter or less is applied to the application amount V of the washing solution. As a result, in wiping the nozzle surface 52 to which the washing solution is applied, it is possible to suppress the occurrence of jetting abnormality of the ink jet head 50 caused by an excess or deficiency of the washing solution.

Effects of Head Maintenance System According to Embodiment

The head maintenance system 1 according to the embodiment can obtain the following effects.

[1]

In a case of wiping the nozzle surface 52 of the ink jet head 50, the web 10 in which the value of the linearity of compression LC measured using a compression tester is 0.3 or more and less than 0.6 is applied. As a result, it is possible to execute the wiping of the nozzle surface 52 in which the wiping performance of the nozzle surface 52 and the suppression of the damage on the nozzle surface 52 are realized.

[2]

A range of 5 kilopascals or more and 20 kilopascals or less is applied as the pressure for pressing the web 10 against the nozzle surface 52. As a result, the change with time of the nozzle surface 52 in a long period of time in which the wiping of the nozzle surface 52 is executed about 6000 times is suppressed.

[3]

The thickness of the web 10 in the non-pressing case is denoted by T0, and the recess amount of the web 10 in a case in which the web 10 is pressed with optional pressure is denoted by dT. DT/T0 is applied as an index value of the wiping strength. In a case in which the value of the linearity of compression LC of the web 10 is in a range of 0.3 or more and less than 0.6, the index value dT/T0 of the wiping strength satisfies $dT/T0\leq-1.1\times LC+0.7$. As a result, even in a case in which the nozzle surface 52 is repeatedly wiped, the damage to the nozzle surface 52 can be suppressed.

[4]

The index value dT/T0 of the wiping strength satisfies $0.04\leq dT/T0\leq-1.1\times LC+0.7$. As a result, the stability of the mechanism that supports the web in wiping the nozzle surface 52 is secured.

[5]

The index value dT/T0 of the wiping strength satisfies $-1.2\times LC+0.7\leq dT/T0\leq-1.1\times LC+0.7$. As a result, the effect of suppressing the damage to the nozzle surface 52 becomes remarkable.

[6]

In a case in which the nozzle surface 52 on which a film of the washing solution is formed is wiped, the application amount V of the washing solution applied per unit area with the value of the compression workload WC of the web 10 in a range of 0.03 gram-force per centimeter or more and 0.59 gram-force per centimeter or less satisfies $0.41\times WC+0.01\leq V\leq0.76\times WC+0.02$. As a result, it is possible to suppress the occurrence of jetting abnormality of the ink jet head 50 caused by an excess or deficiency of the washing solution.

Example of Application to Printing System

Next, an example of application of the head maintenance system 1 described with reference to FIGS. 1 to 8 to a printing system will be described. A printing system 300 described below prints a color image using each color ink of cyan, magenta, yellow, and black.

[Overall Configuration]

Figure 9:
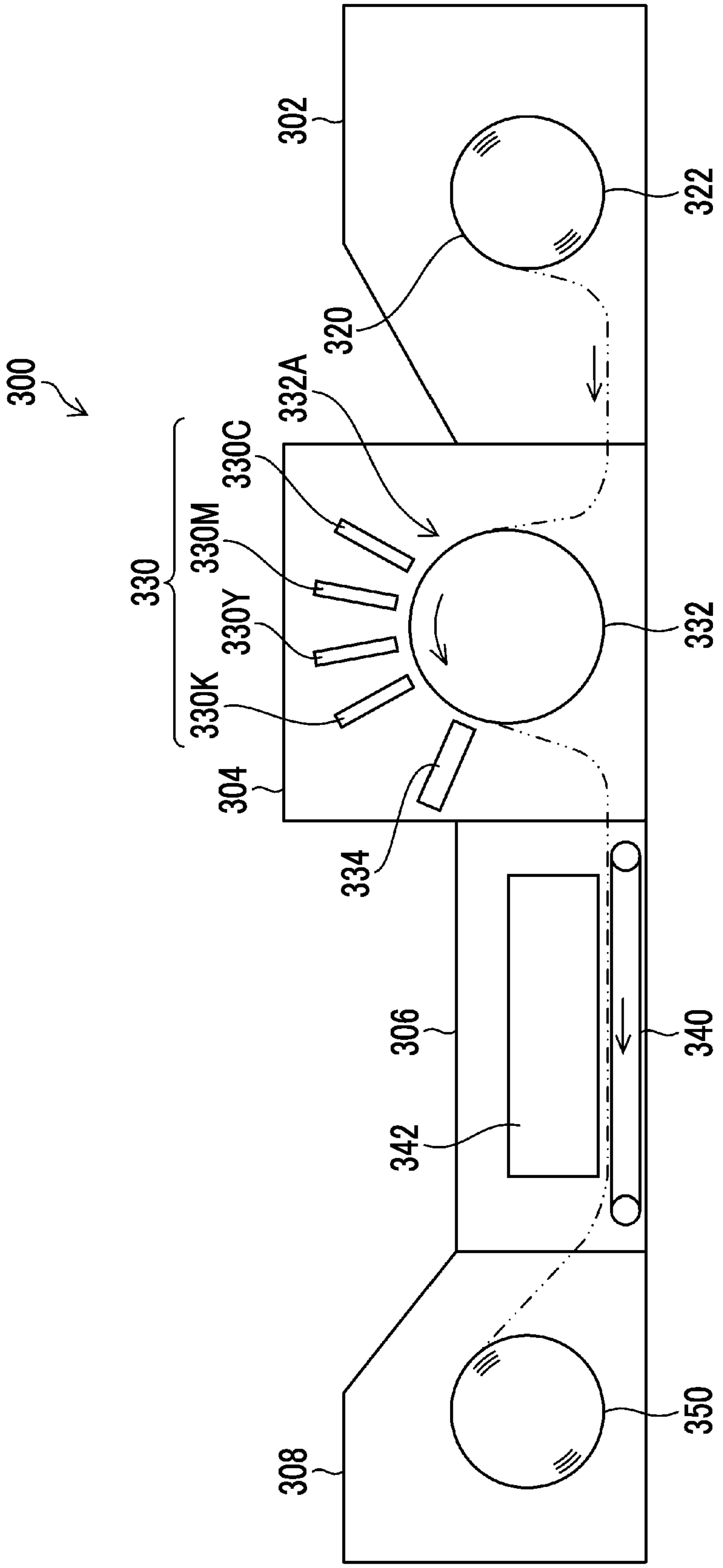
FIG. 9 is an overall configuration diagram of a printing system according to the embodiment.

FIG. 9 is an overall configuration diagram of the printing system according to the embodiment. The printing system 300 shown in FIG. 9 comprises a paper feeding device 302, a jetting device 304, a drying device 306, and a paper discharging device 308. In the printing system 300, roll paper is applied as continuous paper 320, and continuous printing is executed on the roll paper. A two-dot chain line shown in FIG. 1 indicates a conveyance path of the paper 320.

In addition, the printing system 300 comprises a maintenance device that executes maintenance on the ink jet head provided in the jetting device 304. The maintenance device is not shown in FIG. 9. The maintenance device is illustrated with reference numeral 310 in FIG. 10.

The paper feeding device 302 accommodates a delivery roll 322 around which the paper 320 is wound. The paper 320 fed from the delivery roll 322 is conveyed to the jetting device 304. An arrow line shown on the paper feeding device 302 indicates a conveyance direction of the paper 320.

In the present embodiment, the printing system 300 to which the continuous paper 320 is applied has been illustrated, but sheet-fed paper may be applied to the printing system 300. In an aspect in which the sheet-fed paper is applied, the paper feeding device 302 comprises a paper feed tray for storing the sheet-fed paper.

The jetting device 304 comprises an ink jet head 330C, an ink jet head 330M, an ink jet head 330Y, and an ink jet head 330K. The jetting device 304 comprises a printing drum 332.

The ink jet head 330C, the ink jet head 330M, the ink jet head 330Y, and the ink jet head 330K shown in FIG. 9 correspond to the ink jet head 50 shown in FIG. 1.

The ink jet head 330C, the ink jet head 330M, the ink jet head 330Y, and the ink jet head 330K jet cyan ink, magenta ink, yellow ink, and black ink, respectively.

The jetting device 304 uses the ink jet head 330C, the ink jet head 330M, the ink jet head 330Y, and the ink jet head 330K to print a color image on the paper 320 which is supported on an outer peripheral surface 332A of the printing drum 332 by suction.

The jetting device 304 may comprise an ink jet head that jets white ink. The ink jet head that jets the white ink is disposed at a position on a downstream side in the paper conveyance direction of the ink jet head 330K, and forms a base of a color image to be printed on the transparent paper 320.

The ink jet head that jets the white ink is located at a position on the downstream side of the ink jet head 330K in the paper conveyance direction, and may be disposed at a position on an upstream side of an in-line sensor 334.

The jetting device 304 comprises the in-line sensor 334. The in-line sensor 334 reads an image printed on the paper 320 and outputs the read data. The printing system 300 determines whether or not there is a jetting abnormality of the ink jet head 330 based on the read data.

Although FIG. 9 illustrates an aspect in which the printing drum 332 is applied to the conveyance of the paper 320, the conveyance of the paper 320 is not limited to the aspect in which the printing drum 332 is applied. For example, an aspect in which a conveyance belt is applied or the like may be applied.

The drying device 306 comprises a paper conveyance unit 340 and a drying unit 342. The paper conveyance unit 340 supports the paper 320 delivered from the printing drum 332 and conveys the paper 320.

FIG. 9 illustrates an aspect in which a conveyance belt is provided as a configuration example of the paper conveyance unit 340. An aspect in which a chain gripper is provided, an aspect a nip roller is provided, and the like may be applied to the paper conveyance unit 340. For the paper conveyance unit 340, a plurality of types of conveyance members may be combined, as with a combination of a conveyance belt and a chain gripper.

The drying unit 342 executes a drying treatment on the paper 320 conveyed using the paper conveyance unit 340. An aspect in which hot air is ejected, an aspect in which heat is radiated, and the like can be applied to the paper conveyance unit 340. A plurality of types of methods may be used in combination for the paper conveyance unit 340.

The paper discharging device 308 accommodates a winding roll 350 around which the printed paper 320 is wound. The paper discharging device 308 may comprise a cutting device that cuts the paper 320 to have a specified length and a stacking device that stacks the paper 320 cut to have a specified length. The paper discharging device 308 may comprise a stamping device that imprints a stamp on a printed article in which a defect is found, based on a test result of the printed article.

[Maintenance Device]

Figure 10:
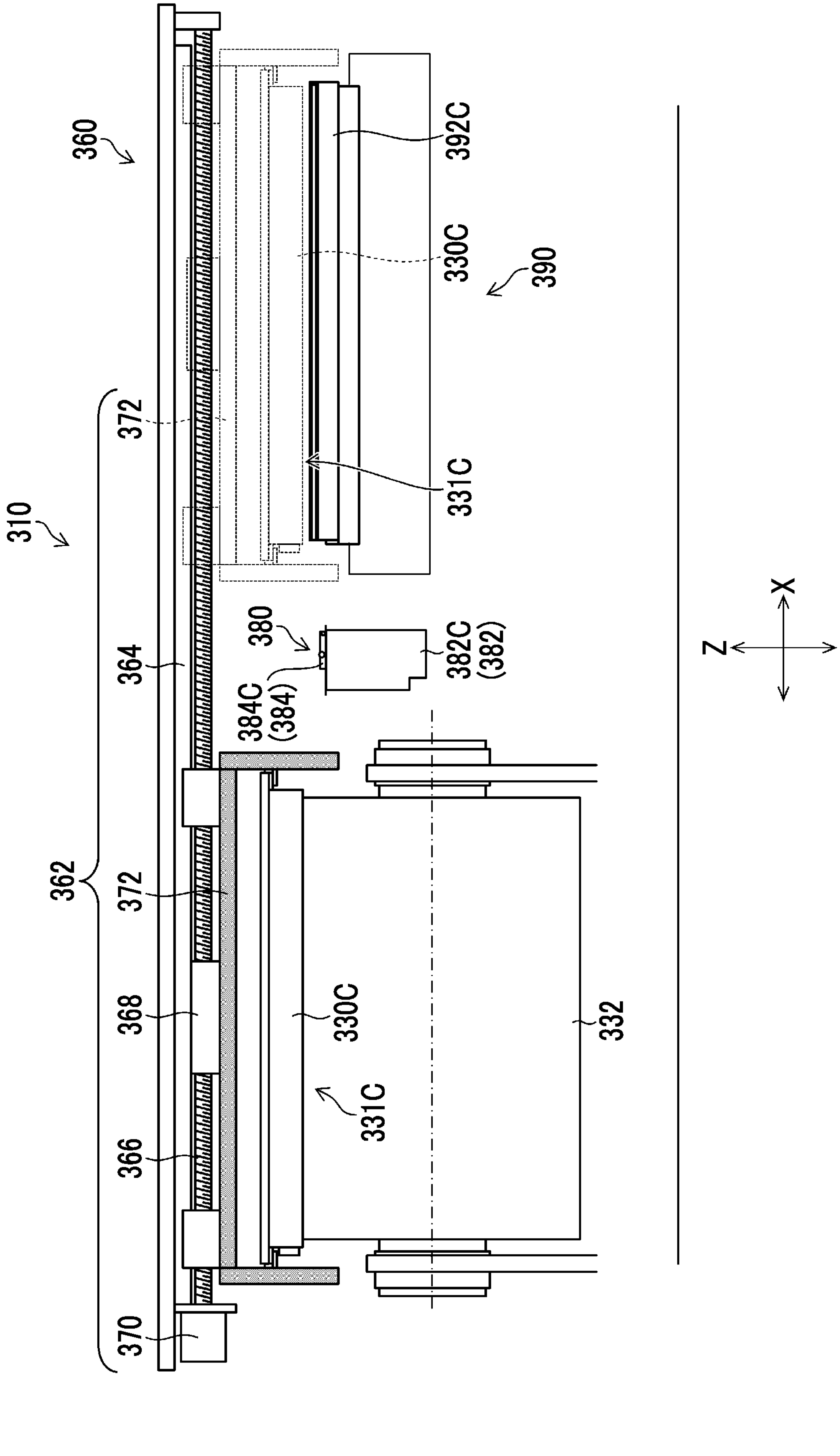
FIG. 10 is a front view showing a configuration example of a maintenance device applied to the printing system shown in FIG. 9.
Figure 11:
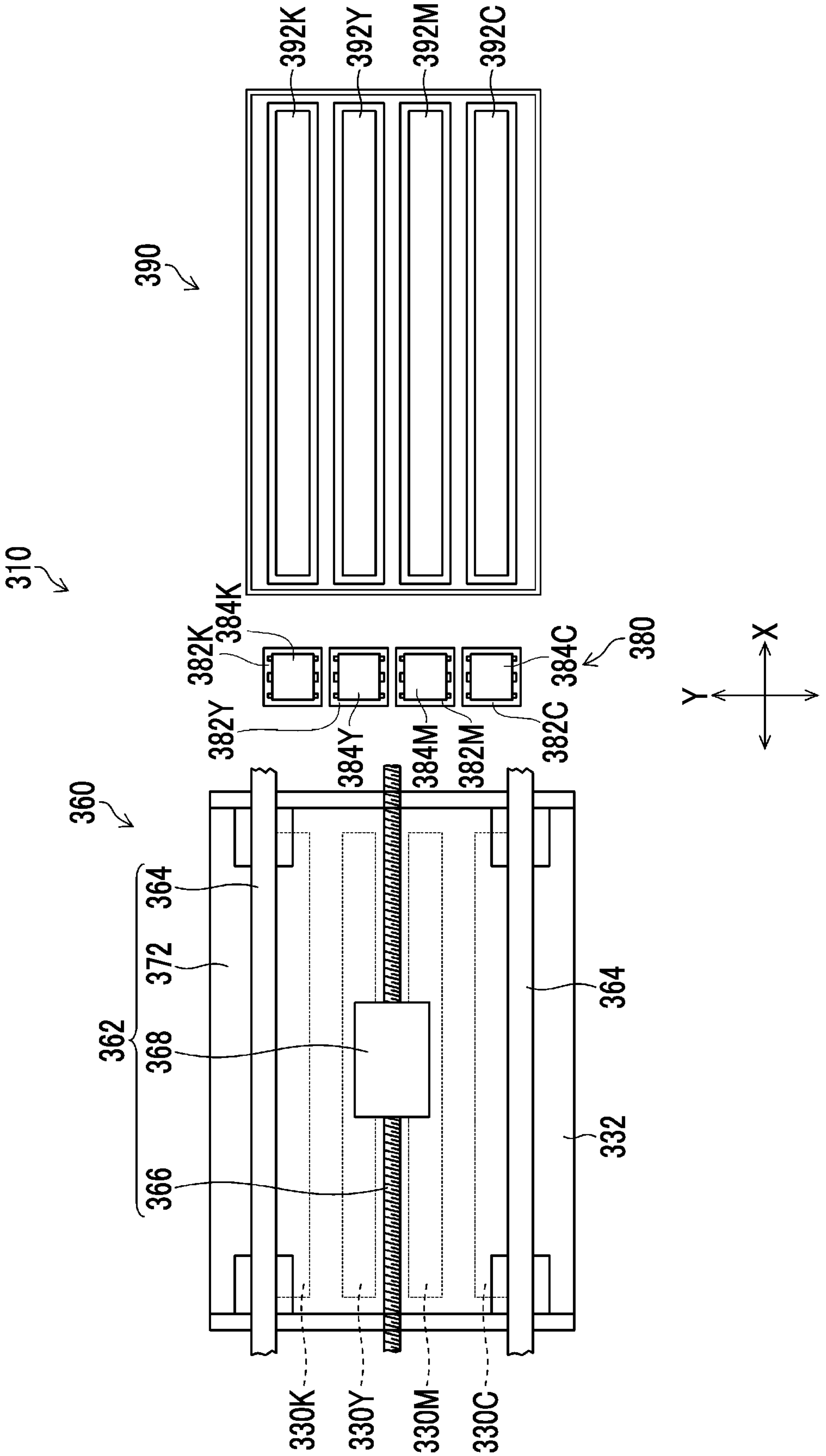
FIG. 11 is a plan view of the maintenance device shown in FIG. 10.

FIG. 10 is a front view showing a configuration example of the maintenance device applied to the printing system shown in FIG. 9. FIG. 11 is a plan view of the maintenance device shown in FIG. 10.

The maintenance device 310 comprises a head moving device 360, a cleaning device 380, and a cap device 390. The head moving device 360 collectively moves the ink jet head 330C, the ink jet head 330M, the ink jet head 330Y, and the ink jet head 330K.

The head moving device 360 comprises a horizontal moving mechanism 362. The horizontal moving mechanism 362 comprises a guide rail 364, a ball screw 366, a nut 368, a motor 370, and a pair of frames 372. The head moving device 360 comprises an elevating mechanism. The elevating mechanism collectively elevates the ink jet head 330C and the like. The elevating mechanism is not shown.

The horizontal moving mechanism 362 reciprocates the ink jet head 330C and the like from a printing position to a capping position in a plane parallel to a horizontal plane along a horizontal direction. The printing position is a position directly above the printing drum 332, and is a position of the ink jet head 330C and the like in a case in which printing is executed on the paper 320. The capping position is a position directly above the cap device 390, and is a position of the ink jet head 330C and the like during capping.

The ink jet head 330C and the like are integrally supported by using the frame 372. The frame 372 is connected to the nut 368. The motor 370 is operated to rotate the ball screw 366. The frame 372 connected to the nut 368 moves in the horizontal direction, and the ink jet head 330C and the like move in the plane parallel to the horizontal plane along the horizontal direction. A control type motor capable of controlling rotation and stop using a command signal, such as a stepping motor and a servo motor, is applied to the motor 370. The head moving device 360 described in the embodiment is an example of a component of a relative movement device.

The cleaning device 380 comprises a cyan head cleaning unit 382C, a magenta head cleaning unit 382M, a yellow head cleaning unit 382Y, and a black head cleaning unit 382K. Reference numeral 382 illustrated in FIG. 10 represents a generic term for the cyan head cleaning unit 382C and the like, or any one of them. Reference numeral 384 represents a generic term for a web 384C and the like, or any one of them.

The cyan head cleaning unit 382C wipes a nozzle surface 331C of the ink jet head 330C using the web 384C. The magenta head cleaning unit 382M wipes a nozzle surface of the ink jet head 330M using a web 384M.

The yellow head cleaning unit 382Y wipes a nozzle surface of the ink jet head 330Y using a web 384Y. The black head cleaning unit 382K wipes a nozzle surface of the ink jet head 330K using a web 384K.

The cleaning device 3 shown in FIG. 1 is applied to the cyan head cleaning unit 382C, the magenta head cleaning unit 382M, the yellow head cleaning unit 382Y, and the black head cleaning unit 382K.

In addition, the web 10 shown in FIG. 1 is applied to the web 384C, the web 384M, the web 384Y, and the web 384K shown in FIG. 10. The cleaning unit 382 described in the embodiment is an example of a component of a relative movement device. The web 384 described in the embodiment is an example of a wiping sheet.

The cap device 390 comprises a cap 392C, a cap 392M, a cap 392Y, and a cap 392K. The cap 392C caps the ink jet head 330C. The cap 392M, the cap 392Y, and the cap 392K cap the ink jet head 330M, the ink jet head 330Y, and the ink jet head 330K, respectively.

The frame 372 and the ink jet head 330C illustrated in FIG. 10 with a broken line show the ink jet head 330C and the like in a state of being capped with the cap 392C.

The maintenance device 310 may comprise a washing solution wiping device that wipes off the washing solution on the nozzle surface 331 with the web in a dry state. The washing solution wiping device may have the same configuration as that of the cleaning unit 382. The maintenance device 310 described in the embodiment is an example of a head maintenance system. The web in a dry state described in the embodiment is an example of a wiping sheet in a dry state.

Configuration Example of Ink Jet Head

Figure 12:
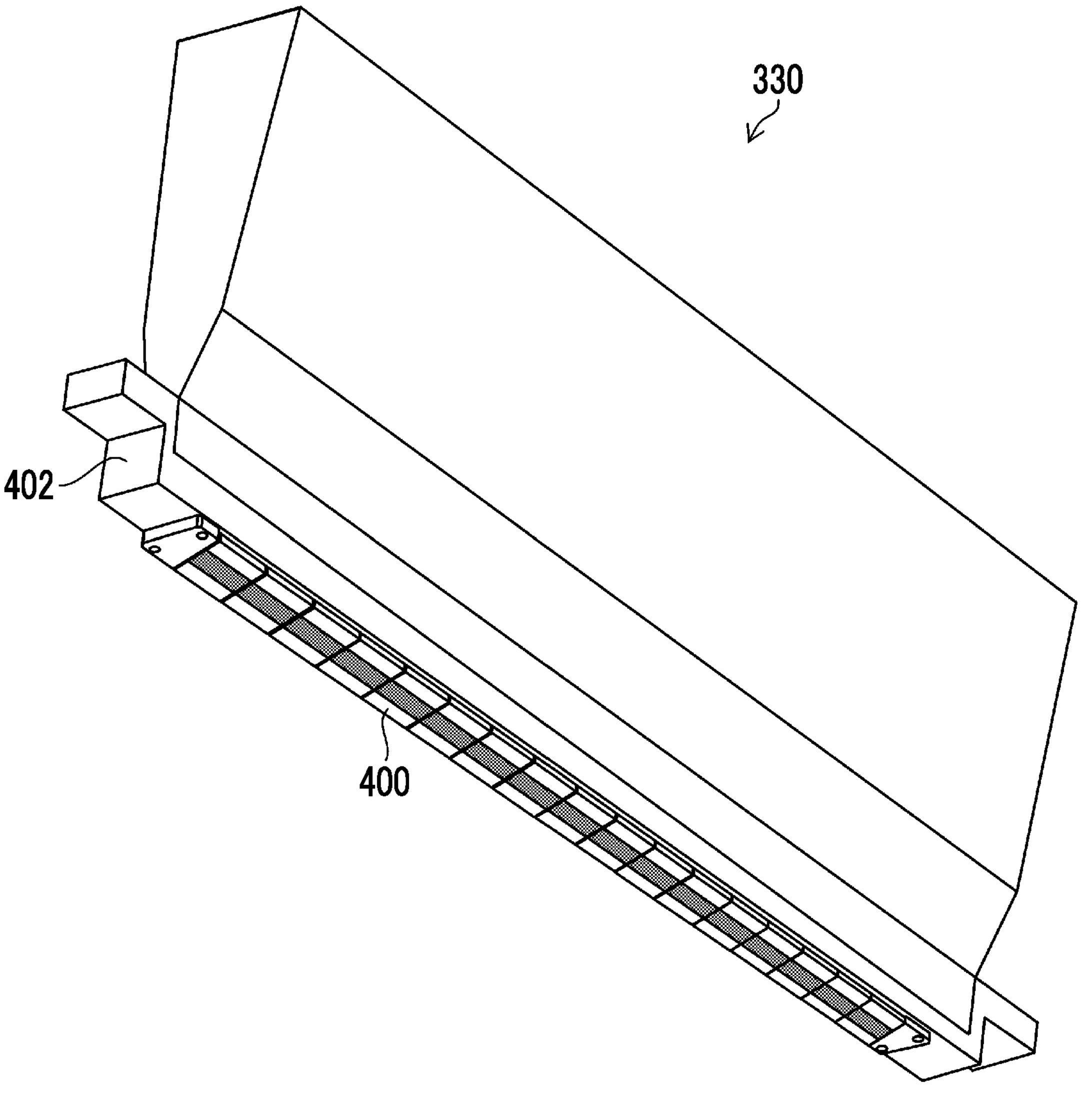
FIG. 12 is a perspective view showing a schematic configuration of an ink jet head applied to the printing system shown in FIG. 9.

FIG. 12 is a perspective view showing a schematic configuration of an ink jet head applied to the printing system shown in FIG. 9. The ink jet head 330C, the ink jet head 330M, the ink jet head 330Y, and the ink jet head 330K shown in FIG. 9 have the same configurations. In the following description, the ink jet heads 330C and the like will be collectively referred to as the ink jet head 330.

The ink jet head 330 shown in FIG. 12 is a line-type ink jet head. In the ink jet head 330, a plurality of head modules 400 are connected to form one bar-shaped ink jet head 330. The head modules 400 are attached to and integrated with a bar frame 402. The head modules 400 can be replaced individually.

Figure 13:
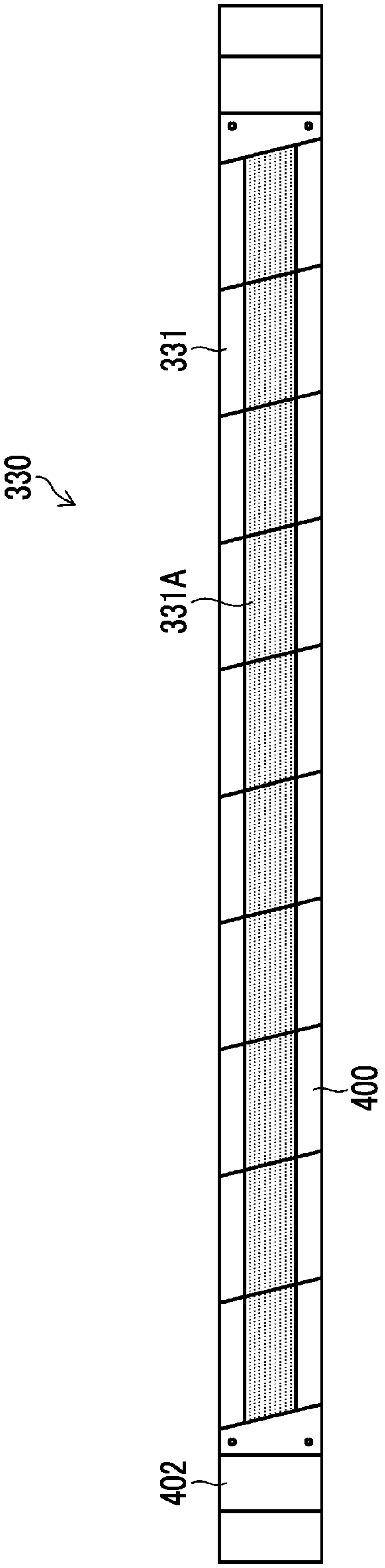
FIG. 13 is a plan view showing a schematic configuration of a nozzle surface of the ink jet head shown in FIG. 12.

FIG. 13 is a plan view showing a schematic configuration of a nozzle surface of the ink jet head shown in FIG. 12. The nozzle surface 331 of the ink jet head 330 has a substantially rectangular shape as a whole, and a nozzle arrangement region 331A is formed in a central portion in a direction orthogonal to the longitudinal direction. A nozzle, which is an outlet for jetting liquid droplets of ink, is provided in the nozzle arrangement region 331A.

Figure 14:
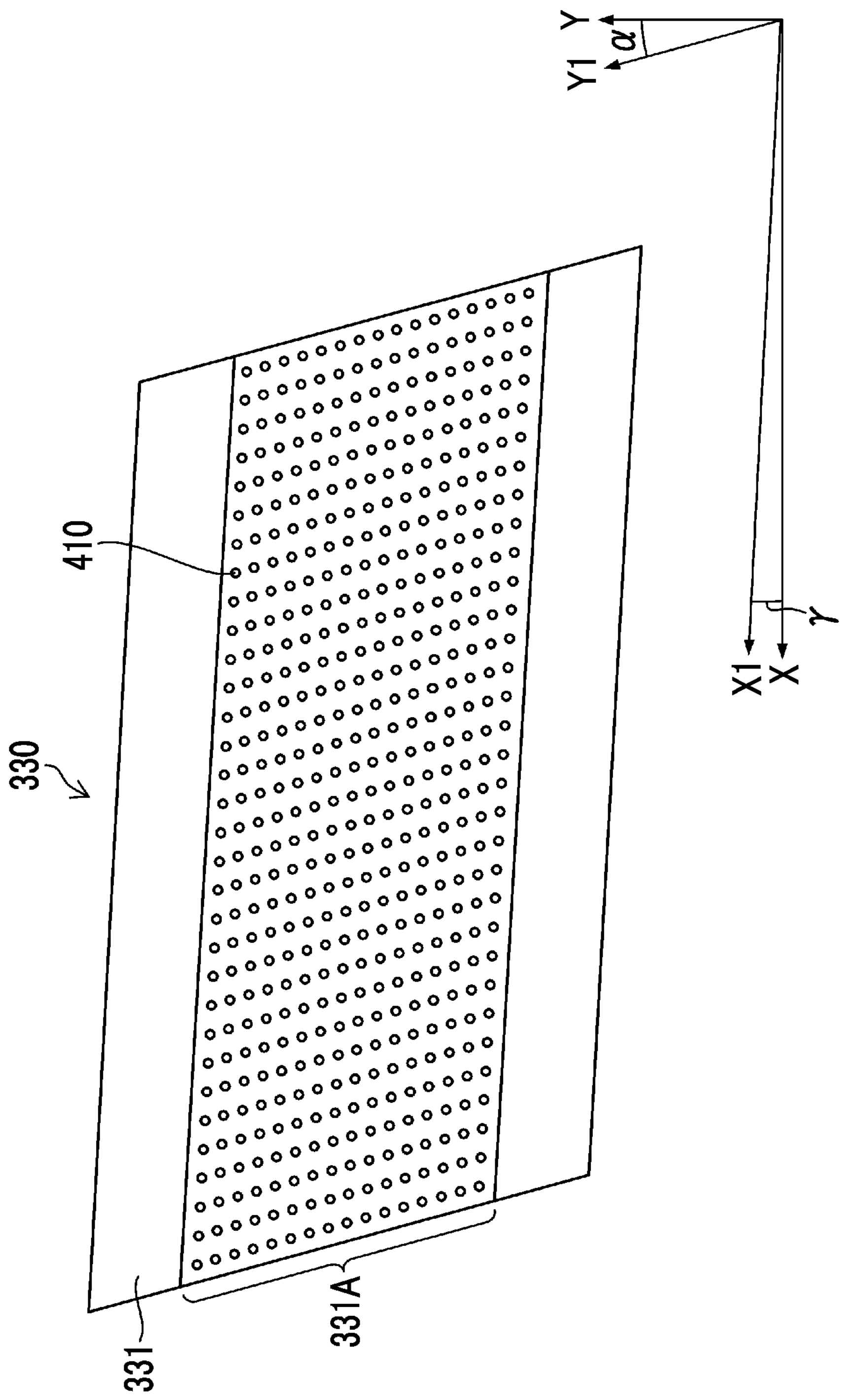
FIG. 14 is an enlarged plan view of a nozzle surface of one head module that is a part of the nozzle surface.

FIG. 14 is an enlarged plan view of a nozzle surface of one head module that is a part of the nozzle surface. In FIG. 14, a direction illustrated by using reference numeral X is the longitudinal direction of the ink jet head 330. The X direction is referred to as a head longitudinal direction. The head longitudinal direction corresponds to a main scanning direction.

In FIG. 14, a direction illustrated by using reference numeral Y is the direction along the conveyance direction of the paper 320. The Y direction is referred to as a paper conveyance direction. The paper conveyance direction corresponds to a sub-scanning direction. The X direction shown in FIG. 14 is the traveling direction of the web 10, and the Y direction shown in FIG. 14 is the width direction of the web 10.

A plurality of nozzle openings 410 are arranged in a matrix on the nozzle surface 331 of the ink jet head 330. For example, on the nozzle surface 331, the nozzle openings 410 are arranged at a certain pitch along a straight line X1 that is inclined at an angle $\gamma$ with respect to the X direction, and the nozzle openings 410 are arranged at a certain pitch along a straight line Y1 that is inclined at an angle $\alpha$ with respect to the Y direction.

The nozzle openings 410 are arranged in this way, whereby it is possible to narrow a substantially interval between the nozzle openings 410 projected to be aligned in the main scanning direction, and to arrange the nozzle openings 410 at a high density. A substantial arrangement direction of the nozzle openings 410 in this case is the X direction. That is, the nozzle openings 410 are arranged substantially along the longitudinal direction of the ink jet head 330.

A water-repellent film having water repellency against ink is formed on the nozzle arrangement region 331A of the nozzle surface 331. As a result, adhesion of dirt to a periphery of the nozzle opening 410 is suppressed. A fluororesin film may be applied as the water-repellent film.

In the present embodiment, the ink jet head 330 comprising the plurality of head modules 400 has been illustrated, but the ink jet head 330 need only comprise one or more head modules 400. In addition, the arrangement of the plurality of head modules 400 is not limited to one row, and an arrangement such as zigzag can be applied.

As a jetting method of the ink jet head 330, a piezoelectric method of jetting a liquid accommodated in a liquid chamber provided with a piezoelectric element from the nozzle opening 410 by using the deflection deformation of the piezoelectric element can be applied. As the jetting method of the ink jet head 330, a thermal method may be applied in which the ink is heated by using a heater and a film boiling phenomenon of the ink is used.

[Electric Configuration of Printing System]

Figure 15:
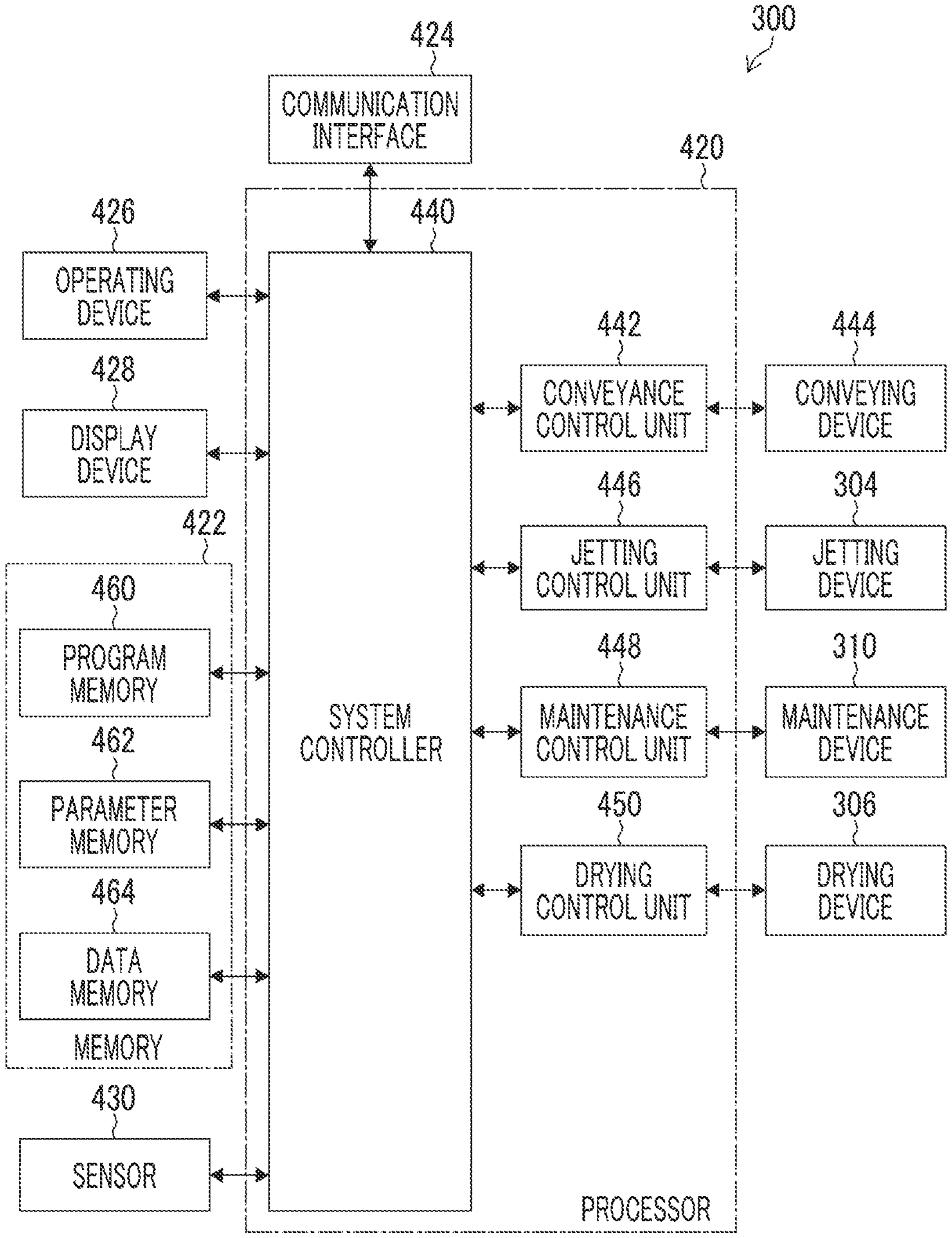
FIG. 15 is a functional block diagram showing an electric configuration of the printing system shown in FIG. 9.

FIG. 15 is a functional block diagram showing an electric configuration of the printing system shown in FIG. 9. The printing system 300 comprises one or more processors 420 and one or more memories 422. The processor 420 reads out various programs stored in the memory 422 and executes the read-out various programs to realize various functions of the printing system 300. That is, various control units provided in the processor 420 correspond to various functions of the printing system 300.

The printing system 300 comprises a communication interface 424. The communication interface 424 acquires data transmitted from an external device. In addition, the communication interface 424 transmits data to the external device. Examples of the external device include a computer such as a server device and a terminal device. Another example of the external device is a memory device such as a storage device.

Various communication standards such as universal serial bus (USB) can be applied to the communication interface 424. The printing system 300 may comprise a plurality of the communication interfaces 424 corresponding to each of a plurality of communication standards. As a communication form of the communication interface 424, either wired communication or wireless communication may be applied.

The printing system 300 comprises an operating device 426 and a display device 428. A keyboard, a mouse, or the like is applied to the operating device 426. The operating device 426 transmits an information signal representing information corresponding to an operation of the user to the processor 420. The processor 420 controls the printing system 300 based on the information signal transmitted from the operating device 426.

The display device 428 displays various types of information in the printing system 300 based on a display signal transmitted from the processor 420. The display device 428 may be integrated with the operating device 426 by applying the touch panel method.

The printing system 300 comprises a sensor 430. The sensor 430 transmits a detection signal to the processor 420. The processor 420 controls the printing system 300 based on the detection signal transmitted from the sensor 430.

The processor 420 comprises a system controller 440. The system controller 440 transmits a command signal to each unit of the printing system 300 to control the printing system 300 in an integrated manner.

The processor 420 comprises a conveyance control unit 442. The conveyance control unit 442 controls a conveying device 444 based on the command signal transmitted from the system controller 440. The conveying device 444 conveys the paper 320 along the paper conveyance path from the paper feeding device 302 to the paper discharging device 308 shown in FIG. 9. The conveying device 444 includes a mechanism for rotating the delivery roll 322 and a mechanism for rotating the printing drum 332, the paper conveyance unit 340, and the winding roll 350.

The processor 420 comprises a jetting control unit 446. The jetting control unit 446 controls the jetting device 304 based on the command signal transmitted from the processor 420.

That is, the jetting control unit 446 controls a jetting timing and an ink jetting amount of the ink jet head 330. The jetting control unit 446 executes correction processing of the ink jet head 330.

The jetting control unit 446 comprises an image processing unit, a driving voltage generation unit, and a driving voltage output unit. The image processing unit executes color separation processing, color conversion processing, correction processing, and halftone processing on the input image data to generate a halftone image for each ink color.

The driving voltage generation unit generates a driving voltage to be supplied to the ink jet head 330 corresponding to each color based on the halftone image for each color. The driving voltage output unit comprises an amplification circuit and an output circuit, and outputs a driving voltage to a pressure generating element provided in the ink jet head 330 corresponding to each color.

The processor 420 comprises a maintenance control unit 448. The maintenance control unit 448 controls the maintenance device 310 based on the command signal transmitted from the system controller 440. The maintenance control unit 448 shown in FIG. 15 comprises components corresponding to the system control unit 120, the travel control unit 122, the head movement control unit 124, and the washing solution application control unit 126 shown in FIG. 2. The system controller 440 shown in FIG. 15 has a function corresponding to the system control unit 120 shown in FIG. 2.

The drying control unit 450 controls the drying device 306 based on the command signal transmitted from the system controller 440. That is, the drying control unit 450 executes a temperature control and an air blow control of the drying unit 342.

A hardware structure similar to that of the processor 100 shown in FIG. 2 is applied to a hardware structure of the processor 420 shown in FIG. 15.

The memory 422 comprises a program memory 460. The program memory 460 stores a program including an instruction executed by the processor 420. The program memory 460 stores an instruction included in a program corresponding to each of a paper conveying function, a jetting function, a maintenance function, and a drying function.

The memory 422 comprises a parameter memory 462. The parameter memory 462 stores various parameters referred to in a case in which the processor 420 executes various programs.

The memory 422 comprises a data memory 464. The data memory 464 stores various types of data acquired by using the communication interface 424. The processor 420 reads out the data stored in the data memory 464 and using the read data and executes various operations using the read-out data. The memory 422 shown in FIG. 15 includes the memory 102 shown in FIG. 2. The same hardware as that of the memory 102 shown in FIG. 2 is applied to the memory 422 shown in FIG. 15.

[Procedure of Head Maintenance Method]

Figure 16:
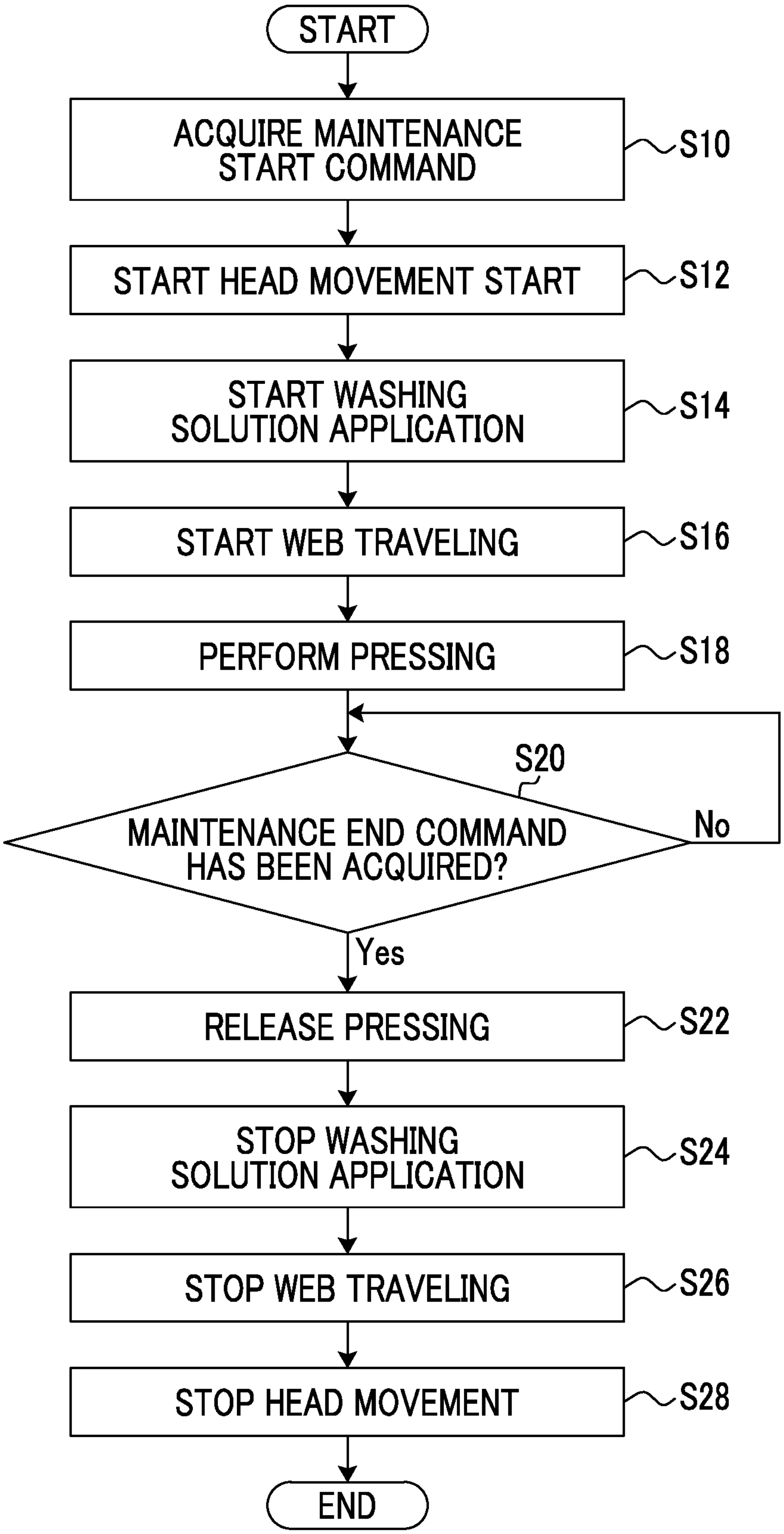
FIG. 16 is a flowchart showing a procedure of a head maintenance method according to the embodiment.

FIG. 16 is a flowchart showing a procedure of a head maintenance method according to the embodiment. In a maintenance start command acquisition step S10, the maintenance control unit 448 shown in FIG. 15 acquires a maintenance start command. After the maintenance start command acquisition step S10, the process proceeds to a head movement start step S12.

In the head movement start step S12, the maintenance control unit 448 starts the movement of the ink jet head 330. For example, the maintenance control unit 448 moves the ink jet head 330 at the capping position to the printing position.

In a washing solution application step S14, the maintenance control unit 448 applies a specified washing solution application condition to apply the washing solution to the web 384. The washing solution application condition includes an application amount of the washing solution per unit area.

In a web traveling start step S16, the maintenance control unit 448 applies a specified web traveling condition to start the traveling of the web 384 shown in FIG. 10. The web traveling condition includes a traveling speed of the web.

In a pressing step S18, the maintenance control unit 448 presses the web 384 provided in the cleaning unit 382 against the nozzle surface 331 of the ink jet head 330. A specified pressing condition is applied to the pressing of the web 384 against the nozzle surface 331. The specified pressing condition includes pressure applied to the nozzle surface 331.

That is, in the pressing step S18, the maintenance control unit 448 raises the cleaning device 380 from a standby position to a wiping position, applies specified pressure, and presses the traveling web 384 against the nozzle surface 331 of the ink jet head 330 passing through the wiping position. As a result, the web 384 applies the washing solution to the nozzle surface 331 and wipes the nozzle surface 331.

In each step from the head movement start step S12 to the pressing step S18, the order shown in FIG. 16 can be changed. In addition, each step from the head movement start step S12 to the pressing step S18 may have overlapping processing periods.

During a wiping treatment period of the nozzle surface 331 of the ink jet head 330, a maintenance end command acquisition determination step S20 is executed. In the maintenance end command acquisition determination step S20, the maintenance control unit 448 determines whether or not a maintenance end command has been acquired.

In the maintenance end command acquisition determination step S20, in a case in which the maintenance control unit 448 determines that the maintenance end command has not been acquired, No determination is made. In a case of the No determination, the maintenance end command acquisition determination step S20 is continued until Yes determination is made in the maintenance end command acquisition determination step S20.

On the other hand, in the maintenance end command acquisition determination step S20, in a case in which the maintenance control unit 448 determines that the maintenance end command has been acquired, Yes determination is made. In a case of the Yes determination, the process proceeds to a pressing release step S22, a washing solution application stop step S24, and a web traveling stop step S26.

In the pressing release step S22, the maintenance control unit 448 separates the web 384 from the nozzle surface 331. Specifically, the maintenance control unit 448 moves the cleaning unit 382 to the standby position.

In the washing solution application stop step S24, the maintenance control unit 448 stops the application of the washing solution to the web 384. In the web traveling stop step S26, the maintenance control unit 448 stops the traveling of the web 384.

The pressing release step S22, the washing solution application stop step S24, and the web traveling stop step S26 may be change in the order shown in FIG. 16 as in the washing solution application step S14 or the like, or the execution periods of the respective steps may overlap. After the web 384 is separated from the nozzle surface 331, the process proceeds to a head movement stop step S28.

In the head movement stop step S28, the maintenance control unit 448 monitors whether or not the ink jet head 330 has reached the printing position, and stops the movement of the ink jet head 330 in a case in which the ink jet head 330 has reached the printing position.

The head maintenance method shown in FIG. 16 may include a washing solution wiping-off step of wiping the nozzle surface 331 with the web 384 in a wet state and then wiping off the washing solution of the nozzle surface 331 with a web in a dry state. In addition, the head maintenance method shown in FIG. 16 may be executed after purging processing of the ink jet head 330 is executed using the cap device 390 shown in FIG. 11.

The head maintenance method shown in FIG. 16 is also applied to the head maintenance system 1 shown in FIG. 1. In the head maintenance method applied to the head maintenance system 1, the travel control unit 122 or the like provided in the processor 100 shown in FIG. 2 is applied instead of the maintenance control unit 448 shown in FIG. 15.

[Ink]

Aqueous ink is applied in the ink jet head 50 shown in FIG. 1. The ink contains an inorganic pigment such as carbon black applied to black ink and titanium oxide applied to white ink. A concentration of the inorganic pigment may be in a range of 8 mass % or more and 16 mass % or less.

The ink includes one or more kinds of polymer particles. Thereby, a certain degree of rub resistance can be obtained for a printed image. Examples of the polymer particles include particles of a resin having an anionic group such as a thermoplastic, thermosetting or denatured acrylic, epoxy, polyurethane, polyether, polyamide, unsaturated polyester, phenolic, silicone, or fluorine resin, a polyvinyl resin such as vinyl chloride, vinyl acetate, polyvinyl alcohol, or polyvinyl butyral, a polyester resin such as an alkyd resin and a phthalate resin, an amino material such as a melamine resin, a melamine formaldehyde resin, an aminoalkyd co-condensing resin, or a urea resin, or copolymers or mixtures thereof.

Among these, the anionic acrylic resin is obtained, for example, by polymerizing an acrylic monomer having an anionic group and, as necessary, another monomer copolymerizable with the anionic group-containing acrylic monomer in a solvent.

Examples of the anionic group-containing acrylic monomer include an acrylic monomer having one or more selected from the group consisting of a carboxyl group, a sulfonic acid group, and a phosphonic group. Among them, an acrylic monomer having a carboxyl group such as acrylic acid, methacrylic acid, crotonic acid, etaacrylic acid, propylacrylic acid, isopropylacrylic acid, itaconic acid, and fumaric acid is preferable, and acrylic acid or methacrylic acid is particularly preferable.

As the polymer particles, self-dispersing polymer particles are preferable, and self-dispersing polymer particles having a carboxyl group are more preferable, from a view point of jetting stability, and from a view point of liquid stability and especially dispersion stability in a case in which pigments are used.

The self-dispersing polymer particles mean particles of a water-insoluble polymer that can get into a dispersed state in an aqueous medium in the absence of other surfactants due to a functional group that the polymer itself, particularly due to an acidic group or a salt thereof and that does not contain a free emulsifier.

The ink contains water. From the viewpoint of securing stability and jetting reliability, the amount of water added to all the ink compositions is preferably in a range of 10 mass % or more and 99 mass % or less. More preferably, the amount of water added to all the ink compositions is 30 mass % or more and 80 mass % or less. Still more preferably, the amount of water added to all the ink compositions is 50 mass % or more and 70 mass % or less.

The ink contains a solvent. As the solvent, a solvent applied to the washing solution can be applied. The ink may contain one kind or two or more kinds of solvents. The content of the solvent is preferably in a range of 1 mass % or more and 60 mass % or less. More preferably, the content of the solvent is in a range of 5 mass % or more and 40 mass % or less, and still more preferably, the content of the solvent is in a range of 5 mass % or more and 30 mass % or less.

The ink may contain other components in addition to the above-mentioned essential components. Examples of other components include an additive such as a surfactant, an ultraviolet absorbing agent, an antifading agent, a fungicide, a pH adjusting agent, a rust inhibitor, an antioxidant, an emulsion stabilizer, a preservative, an antifoaming agent, a viscosity adjuster, a dispersion stabilizer, and a chelating agent.

[Washing Solution]

The washing solution contains a solvent having certain solubility in the firmly-adhering ink adhering to the nozzle surface 331. As a result, constant wiping performance in a case of wiping the nozzle surface 331 is maintained. The washing solution may contain one kind or two or more kinds of solvents.

Examples of the compound applied to the solvent include diethylene glycol monoethyl ether, diethylene glycol monobutyl ether, triethylene glycol monobutyl ether, dipropylene glycol monomethyl ether, and dipropylene glycol monobutyl ether.

In the embodiment of the present invention described above, the configuration requirements can be changed, added, or deleted as appropriate without departing from the spirit of the present invention. The present invention is not limited to the embodiment described above, and many modifications can be made by a person having ordinary knowledge in the art within the technical idea of the present invention. In addition, the embodiment, modification example, and application example may be combined as appropriate.

EXPLANATION OF REFERENCES

1: head maintenance system
2: head moving device
3: cleaning device
4: washing solution applying device
10: web
12: case
14: supply shaft
16: winding shaft
18: pressing roller
20: pre-stage guide portion
20A: guide roller
20B: guide roller
20C: guide roller
22: post-stage guide portion
22A: guide roller
22B: guide roller
24: feed roller
32: supply shaft rotary drive motor
34: winding shaft rotary drive motor
36: feed roller rotary drive motor
38: control circuit
50: ink jet head
52: nozzle surface
56: spring
60: ball screw
62: carriage
64: head moving motor
70: washing solution tank
72: washing solution flow passage
74: washing solution pump
100: processor
102: memory
104: communication interface
106: operating device
108: display device
120: system control unit
122: travel control unit
124: head movement control unit
126: washing solution application control unit
128: web traveling device
140: program memory
142: parameter memory
144: data memory
180: curve
182: curve
191: web
192: web
193: web
194: web
195: web
196: web
197: web
200: straight line
202: straight line
210: straight line
211: plot
212: straight line
213: plot
214: straight line
215: plot
217: plot
220: straight line
222: straight line
223: plot
224: plot
225: plot
226: plot
227: plot
228: plot
300: printing system
302: paper feeding device
304: jetting device
306: drying device
308: paper discharging device
310: maintenance device
320: paper
322: delivery roll
330: ink jet head
330C: ink jet head
330K: ink jet head
330M: ink jet head
330Y: ink jet head
331: nozzle surface
331C: nozzle surface
332: printing drum
332A: outer peripheral surface
334: in-line sensor
340: paper conveyance unit
342: drying unit
350: winding roll
360: head moving device
362: horizontal moving mechanism
364: guide rail
366: ball screw
368: nut
370: motor
372: frame
380: cleaning device
382: cleaning unit
382C: cyan head cleaning unit
382K: black head cleaning unit 382M: magenta head cleaning unit
382Y: yellow head cleaning unit
384: web
384C: web
384K: web
384M: web
384Y: web
390: cap device
392C: cap
392K: cap
392M: cap
392Y: cap
400: head module
402: bar frame
410: nozzle opening
420: processor
422: memory
424: communication interface
426: operating device
428: display device
430: sensor
440: system controller
442: conveyance control unit
444: conveying device
446: jetting control unit
448: maintenance control unit
450: drying control unit
460: program memory
462: parameter memory
464: data memory
S10 to S28: each step of head maintenance method

What is claimed is:

1. A head maintenance system comprising:
a wiping device including a wiping sheet for wiping a nozzle surface of an ink jet head;
a relative movement device that relatively moves the ink jet head and the wiping sheet; and
a pressing device that presses the wiping sheet against the nozzle surface,
wherein the wiping device includes the wiping sheet having a value of linearity of compression in a range of 0.3 or more and less than 0.6, the linearity of compression being measured using a compression tester.

2. The head maintenance system according to claim 1,
wherein the wiping device includes the wiping sheet satisfying dT/T0≤−1.1×LC+0.7 in a case in which an uncompressed thickness in a case in which specified pressure is not applied is denoted by T0, a compressed thickness in a case in which the specified pressure is applied is denoted by dT, and the linearity of compression is denoted by LC.

3. The head maintenance system according to claim 2,
wherein the wiping device includes the wiping sheet in which the uncompressed thickness T0, the compressed thickness dT, and the linearity of compression LC satisfy 0.4≤dT/T0≤−1.1×LC+0.7.

4. The head maintenance system according to claim 2,
wherein the wiping device includes the wiping sheet in which the uncompressed thickness T0, the compressed thickness dT, and the linearity of compression LC satisfy −1.2×LC+0.7≤dT/T0 ≤−1.1×LC+0.7.

5. The head maintenance system according to claim 1, further comprising:
a washing solution applying device that applies a washing solution to at least any of the nozzle surface or the wiping sheet.

6. The head maintenance system according to claim 5, further comprising:
one or more processors,
wherein the processor executes a control of the washing solution applying device such that an application amount of the washing solution applied from the washing solution applying device is in a range of 0.41×WC+0.01 milliliters per square centimeter or more and 0.76×WC+0.02 milliliters per square centimeter or less, in a case in which a compression workload of the wiping sheet measured using the compression tester is denoted by WC, and the compression workload WC is 0.03 gram-force per centimeter or more and 0.59 gram-force per centimeter or less.

7. The head maintenance system according to claim 5, further comprising:
a washing solution wiping device that wipes off the washing solution adhering to the nozzle surface by using a wiping sheet in a dry state.

8. The head maintenance system according to claim 1,
wherein the pressing device applies pressure of 5 kilopascals or more and 20 kilopascals or less to the nozzle surface.

9. A printing system comprising:
an ink jet head; and
a maintenance device of the ink jet head,
wherein the maintenance device includes
a wiping sheet for wiping a nozzle surface of the ink jet head,
a relative movement device that relatively moves the ink jet head and the wiping sheet, and
a pressing device that presses the wiping sheet against the nozzle surface, and
the wiping sheet has a value of linearity of compression in a range of 0.3 or more and less than 0.6, the linearity of compression being measured using a compression tester.

10. The printing system according to claim 9,
wherein, in the ink jet head, a water-repellent film having water repellency against ink jetted from the ink jet head is formed on the nozzle surface.

11. A head maintenance method comprising:
pressing a wiping sheet for wiping a nozzle surface of an ink jet head against the nozzle surface;
relatively moving the ink jet head and the wiping sheet; and
wiping the nozzle surface by using the wiping sheet,
wherein the wiping sheet having a value of linearity of compression in a range of 0.3 or more and less than 0.6 is applied, the linearity of compression being measured using a compression tester.

* * * * *